US012697706B2

(12) United States Patent
Gaspar et al.

(10) Patent No.: US 12,697,706 B2
(45) Date of Patent: Aug. 4, 2026

(54) POWER TOOL INCLUDING IMPACT MECHANISM HAVING VIBRATION COMPENSATION

(71) Applicant: MILWAUKEE ELECTRIC TOOL CORPORATION, Brookfield, WI (US)

(72) Inventors: Austin Gaspar, Maple Valley, WA (US); Andrew D. Bendtsen, Oak Creek, WI (US); Sofia Diaz, Brookfield, WI (US); Mackenzie J. Nick, Theresa, WI (US); Braden A. Roberts, Brookfield, WI (US); Jacob P. Schneider, Cedarburg, WI (US); Jacob R. Seifert, Lake Mills, WI (US); Nathan P. Sievers, West Allis, WI (US); Spencer D. Stingl, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/987,914

(22) Filed: Dec. 19, 2024

(65) Prior Publication Data

US 2025/0196308 A1 Jun. 19, 2025

Related U.S. Application Data

(60) Provisional application No. 63/612,168, filed on Dec. 19, 2023.

(51) Int. Cl.
*B25F 5/00* (2006.01)
*B25B 21/02* (2006.01)

(52) U.S. Cl.
CPC ............ *B25F 5/006* (2013.01); *B25B 21/023* (2013.01); *B25F 5/001* (2013.01)

(58) Field of Classification Search
CPC ......... B25B 21/023; B25F 5/006; B25F 5/001
See application file for complete search history.

(56) References Cited

U.S. PATENT DOCUMENTS 7,032,687 B2 4/2006 Rask
8,490,714 B2 7/2013 Nakamura
(Continued)

FOREIGN PATENT DOCUMENTS

CN 102256754 A 11/2011
EP 2379282 B1 9/2016
(Continued)

*Primary Examiner* — Andrew M Tecco
*Assistant Examiner* — Nicholas E Igbokwe
(74) *Attorney, Agent, or Firm* — Michael Best & Friedrich LLP

(57) ABSTRACT

A power tool includes a housing, a drive unit, and an impact mechanism. The drive unit is supported by the housing and includes a motor configured to drive rotation of an output shaft to provide a torque output. The impact mechanism is supported by the housing. The impact mechanism includes a camshaft, a first mass, a second mass, an anvil, and a spring. The camshaft receives the torque output from the drive unit. The first mass is mounted to the camshaft and is configured to translate along the camshaft. The second mass is mounted to the camshaft. The anvil is configured to receive an impact torque from the first mass. The anvil includes an output portion that is configured to apply the torque from the first mass to a workpiece.

20 Claims, 16 Drawing Sheets

(56) References Cited

U.S. PATENT DOCUMENTS

| | | | | |
|---|---|---|---|---|
| 9,975,224 | B2 | 5/2018 | Tanaka et al. | |
| 10,016,881 | B2 | 7/2018 | Aoyagi | |
| 10,668,602 | B2 | 6/2020 | Ishibashi | |
| 10,786,888 | B2 | 9/2020 | Chung et al. | |
| 11,235,444 | B2 | 2/2022 | Muramatsu et al. | |
| 11,247,316 | B2 | 2/2022 | Hirabayashi et al. | |
| 2004/0206525 | A1 | 10/2004 | Rask | |
| 2008/0047723 | A1* | 2/2008 | Kamegai | B25D 17/24 173/109 |
| 2008/0308286 | A1* | 12/2008 | Puzio | B25B 21/00 173/210 |
| 2013/0048327 | A1* | 2/2013 | Machida | B25D 17/24 173/162.2 |
| 2016/0229038 | A1* | 8/2016 | Matsumoto | B25F 5/006 |
| 2020/0009709 | A1* | 1/2020 | Kumagai | B25B 21/02 |
| 2021/0053201 | A1* | 2/2021 | Mandal | B25B 21/02 |
| 2021/0086333 | A1 | 3/2021 | Murakami et al. | |
| 2021/0194320 | A1* | 6/2021 | Smith | H02K 1/2733 |
| 2025/0187154 | A1* | 6/2025 | Ter Braack | B25B 21/026 |

FOREIGN PATENT DOCUMENTS

| | | | |
|---|---|---|---|
| WO | 2010069647 | A1 | 6/2010 |
| WO | 2011017066 | A1 | 2/2011 |
| WO | 2013108557 | A1 | 7/2013 |

* cited by examiner

POWER TOOL INCLUDING IMPACT MECHANISM HAVING VIBRATION COMPENSATION

CROSS-REFERENCE TO RELATED APPLICATIONS

The application claims priority to U.S. Provisional Patent Application No. 63/612,168, filed Dec. 19, 2024, the entire contents of which are incorporated by reference herein.

BACKGROUND

The present disclosure relates to power tools with impact mechanisms, and more specifically, to power tools with rotational impact mechanisms ("rotary impact tools"), such as impact drivers, impact wrenches, and the like.

Rotary impact tools typically include a hammer coupled to a camshaft such that the hammer is able to reciprocate along the camshaft, storing energy in a spring, and also to rotate relative to the camshaft to deliver periodic rotational impacts to an anvil. The reciprocation of the hammer along the camshaft produces axial vibrations, which can result in user discomfort and fatigue.

SUMMARY

In some aspects, the techniques described herein relate to a power tool including: a housing; a drive assembly supported by the housing and including a motor configured to drive an output; and an impact mechanism supported by the housing, the impact mechanism including a camshaft coupled for co-rotation with the output of the drive assembly, an anvil extending from the housing, a first mass coupled to the camshaft such that the first mass is configured to reciprocate along the camshaft and rotate relative to the camshaft to deliver periodic rotational impacts to the anvil, and a second mass coupled to the camshaft such that the second mass is configured to reciprocate along the camshaft opposite the first mass to at least partially compensate vibrations caused by reciprocation of the first mass.

In some aspects, the techniques described herein relate to a power tool, wherein the impact mechanism includes a first spring biasing the first mass toward the anvil.

In some aspects, the techniques described herein relate to a power tool, wherein the impact mechanism includes a second spring biasing the second mass in a direction away from the anvil.

In some aspects, the techniques described herein relate to a power tool, wherein the camshaft includes a flange positioned between the first spring and the second spring.

In some aspects, the techniques described herein relate to a power tool, wherein the anvil is a first anvil, wherein the impact mechanism includes a second anvil coupled for co-rotation with the first anvil, and wherein the second mass is configured to deliver periodic rotational impacts to the second anvil.

In some aspects, the techniques described herein relate to a power tool, wherein the impact mechanism includes a pin extending between the first mass and the second mass.

In some aspects, the techniques described herein relate to a power tool, wherein the first mass includes a first groove defined in an outer surface of the first mass, wherein the second mass includes a second groove defined in an outer surface of the second mass, and wherein the pin is at least partially received in both the first groove and the second groove to couple the first mass for co-rotation with the second mass.

In some aspects, the techniques described herein relate to a power tool, wherein the impact mechanism further includes a cage that surrounds the first mass and the second mass, and wherein the first mass and the second mass are coupled for co-rotation with the cage.

In some aspects, the techniques described herein relate to a power tool, wherein the housing includes a handle portion having a grip, and wherein the power tool is configured to produce a total hand arm vibration at the grip of less than 9.8 $m/s^2$ while delivering 2,000 ft-lbs of fastening torque to a workpiece coupled to the anvil.

In some aspects, the techniques described herein relate to a power tool, wherein the drive assembly includes a transmission driven by the motor, wherein the transmission includes a plurality of planet gears and a planet carrier, and wherein the planet carrier defines the output of the drive assembly.

In some aspects, the techniques described herein relate to a power tool including: a housing; a drive assembly supported by the housing and including a motor configured to drive an output; and an impact mechanism including a camshaft driven by the output of the drive assembly, an anvil extending from the housing, a first mass coupled to the camshaft such that the first mass is configured to reciprocate along the camshaft and rotate relative to the camshaft to deliver periodic rotational impacts to the anvil, a second mass coupled to the camshaft such that the second mass is configured to reciprocate along the camshaft, and a cage surrounding both the first mass and the second mass, wherein the cage is coupled for co-rotation with the first mass or the anvil.

In some aspects, the techniques described herein relate to a power tool, wherein the anvil is a first anvil, wherein the impact mechanism further includes a second anvil, and wherein the second mass is configured to reciprocate along the camshaft and rotate relative to the camshaft to deliver periodic rotational impacts to the second anvil.

In some aspects, the techniques described herein relate to a power tool, wherein the cage is coupled for co-rotation with the first anvil and the second anvil.

In some aspects, the techniques described herein relate to a power tool, wherein the cage is coupled for co-rotation with the first mass and the second mass.

In some aspects, the techniques described herein relate to a power tool, wherein the first mass and the second mass are biased in opposite directions.

In some aspects, the techniques described herein relate to a power tool including: a housing; a drive assembly supported by the housing and including a motor configured to drive an output; and an impact mechanism supported by the housing, the impact mechanism including a camshaft coupled for co-rotation with the output of the drive assembly, an anvil extending from the housing, a first mass coupled to the camshaft such that the first mass is configured to reciprocate along the camshaft and rotate relative to the camshaft to deliver periodic rotational impacts to the anvil, and a second mass configured to reciprocate relative to the camshaft to at least partially compensate vibrations caused by reciprocation of the first mass.

In some aspects, the techniques described herein relate to a power tool, wherein the camshaft includes a first cam groove and a second cam groove, wherein the first mass is coupled to the camshaft via the first cam groove, and wherein the second mass is coupled to the camshaft via the second cam groove.

In some aspects, the techniques described herein relate to a power tool, wherein the second mass is coupled for co-rotation with the first mass.

In some aspects, the techniques described herein relate to a power tool, further including a ramped collar coupled for co-rotation with the camshaft and a spring biasing the second mass into engagement with the ramped collar, wherein rotation of the ramped collar relative to the second mass causes the second mass to reciprocate relative to the camshaft.

In some aspects, the techniques described herein relate to a power tool, further including a cage surrounding the first mass and the second mass, wherein the first mass, the second mass, and the cage are coupled together for co-rotation.

Other features and aspects of the present disclosure will become apparent upon consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
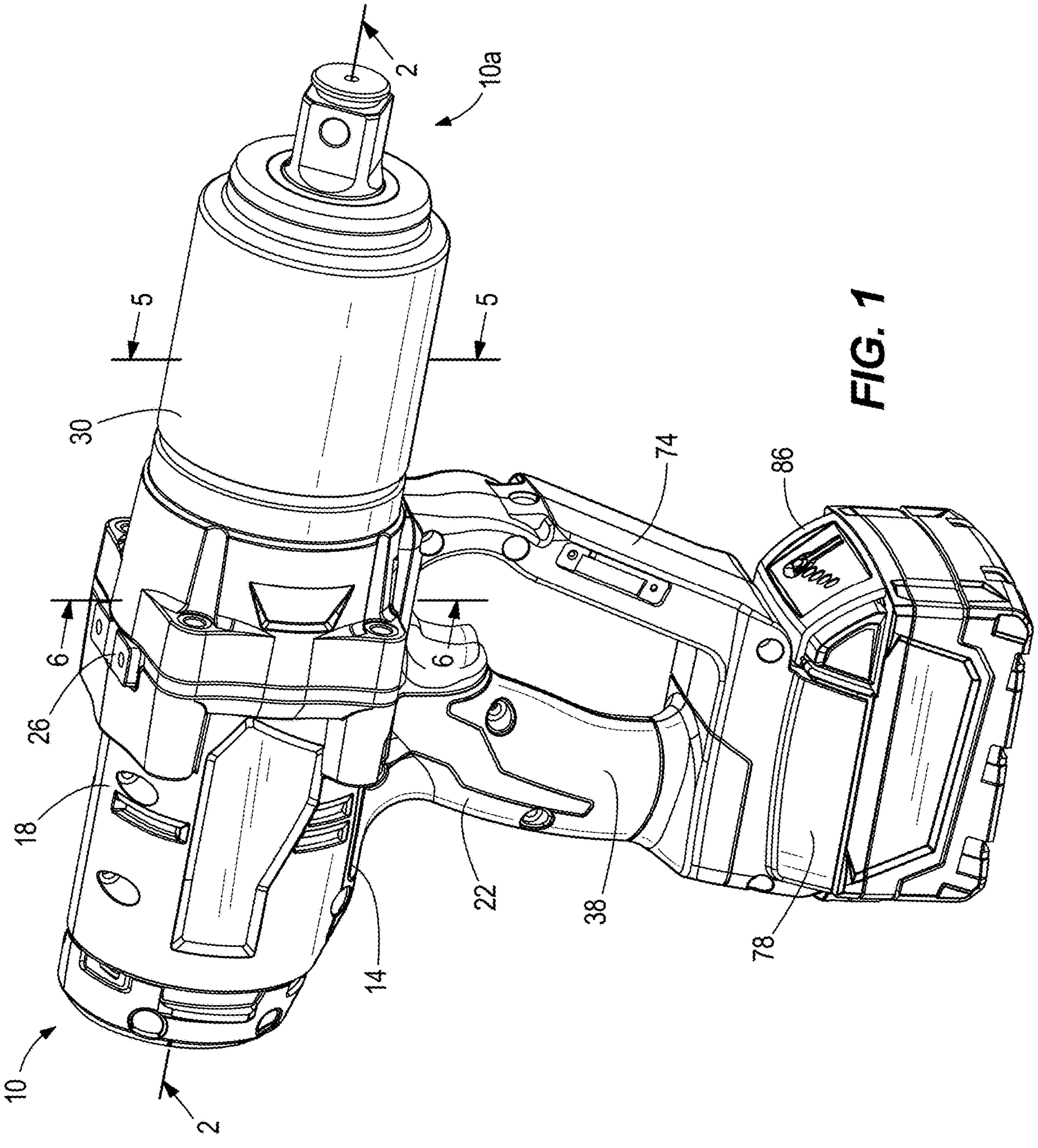
FIG. 1 is a perspective view of a power tool including an impact mechanism according to an embodiment of the disclosure.
Figure 2:
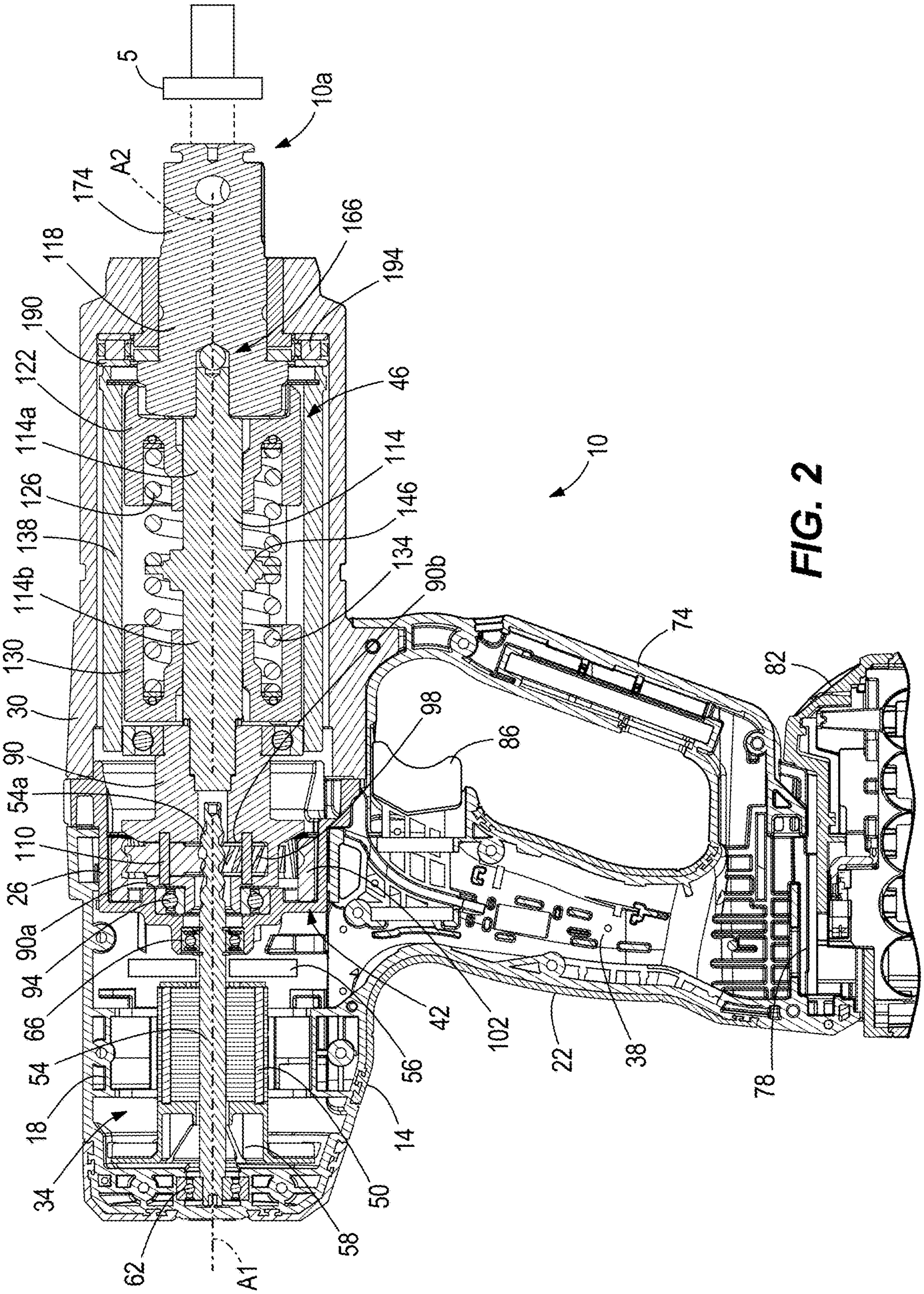
FIG. 2 is a cross-sectional view of the power tool of FIG. 1 taken along line 2-2 of FIG. 1.

FIGS. 1 and 2 illustrate a power tool 10 in the form of a rotary impact tool 10. The impact tool 10 includes a housing 14 with a drive unit housing portion 18, a handle housing portion 22 extending downwardly from the drive unit housing portion 18, an intermediate case 26 coupled to the drive unit housing portion 18, and an impact case or front housing portion 30 coupled to a side of the intermediate case 26 opposite from the drive unit housing portion 18. In the illustrated embodiment, the drive unit housing portion 18 and the handle housing portion 22 are defined by cooperating first and second clamshell halves or housing portions. The drive unit housing portion 18 houses a drive unit 34 that is configured to produce, or generate, a torque output. The handle housing portion 22 defines a grip 38 configured to be grasped by a user for operation of the impact tool 10. The intermediate case 26 houses a transmission assembly 42 configured to receive torque from the drive unit 34. The drive unit 34 and the transmission assembly 42 form a drive assembly. The front housing portion 30 houses an impact mechanism 46, which is configured to receive torque from the transmission assembly 42 and provide, or deliver, torque at an output end 10*a* of the impact tool 10.

With reference to FIG. 2, the drive unit 34 includes a motor 50, an output shaft 54 configured to be driven by the motor 50 to provide a torque output, a printed circuit board assembly ("PCBA") 56 for controlling operation of the motor 50, and a fan 58 mounted to the output shaft 54. The motor 50 is a brushless direct current ("BLDC") motor. As such, the motor 50 may include a stator and a rotor. The output shaft 54 defines a motor axis A1, and the motor 50 is configured to drive rotation of the output shaft 54 about the motor axis A1. The output shaft 54 is supported by a rear bearing 62 and front bearing 66. The rear bearing 62 is supported by the drive unit housing portion 18 at a rear end of the impact tool 10. The front bearing 66 is supported by the intermediate case 26 and is positioned on a side of the motor 50 opposite from the rear bearing 62. In the illustrated embodiment, the PCBA 56 is positioned between the motor 50 and the front bearing 66. In other embodiments, the PCBA 56 may be positioned elsewhere. The fan 58 is mounted to the output shaft 54 at a position located between the motor 50 and the rear bearing 62. As such, the motor 50 is configured to drive rotation of the fan 58. As the fan 58 rotates, the fan 58 may induce a flow of cooling air to flow past the motor 50 to cool the motor 50 and the PCBA 56.

The handle housing portion 22 defines the grip 38, a support member 74, and a battery receptacle 78 that receives a battery 82 configured to supply electricity to the motor 50. The grip 38 supports a switch (e.g., a trigger switch) 86 that electrically connects the motor 50 and the battery 82 to provide DC power to the motor 50. As such, a user may actuate the switch to send a signal to the PCBA 56 to energize the motor 50 such that the drive unit 34 begins to produce torque. The support member 74 is positioned forward of the grip 38 and may act as a guard for a user's hand grasping the grip 38. That is, for example, the support member 74 is positioned such that the support member 74 will engage, or come into contact with, a workpiece 5 to inhibit the user's hand from engaging, or coming into contact with, the workpiece 5. Although the workpiece 5 is illustrated in FIG. 2 as a fastener, the impact tool 10 may perform a working operation on larger workpieces and/or workpiece assemblies in which the user's hand could potentially come into contact with the workpiece and/or workpiece assembly.

Figure 3:
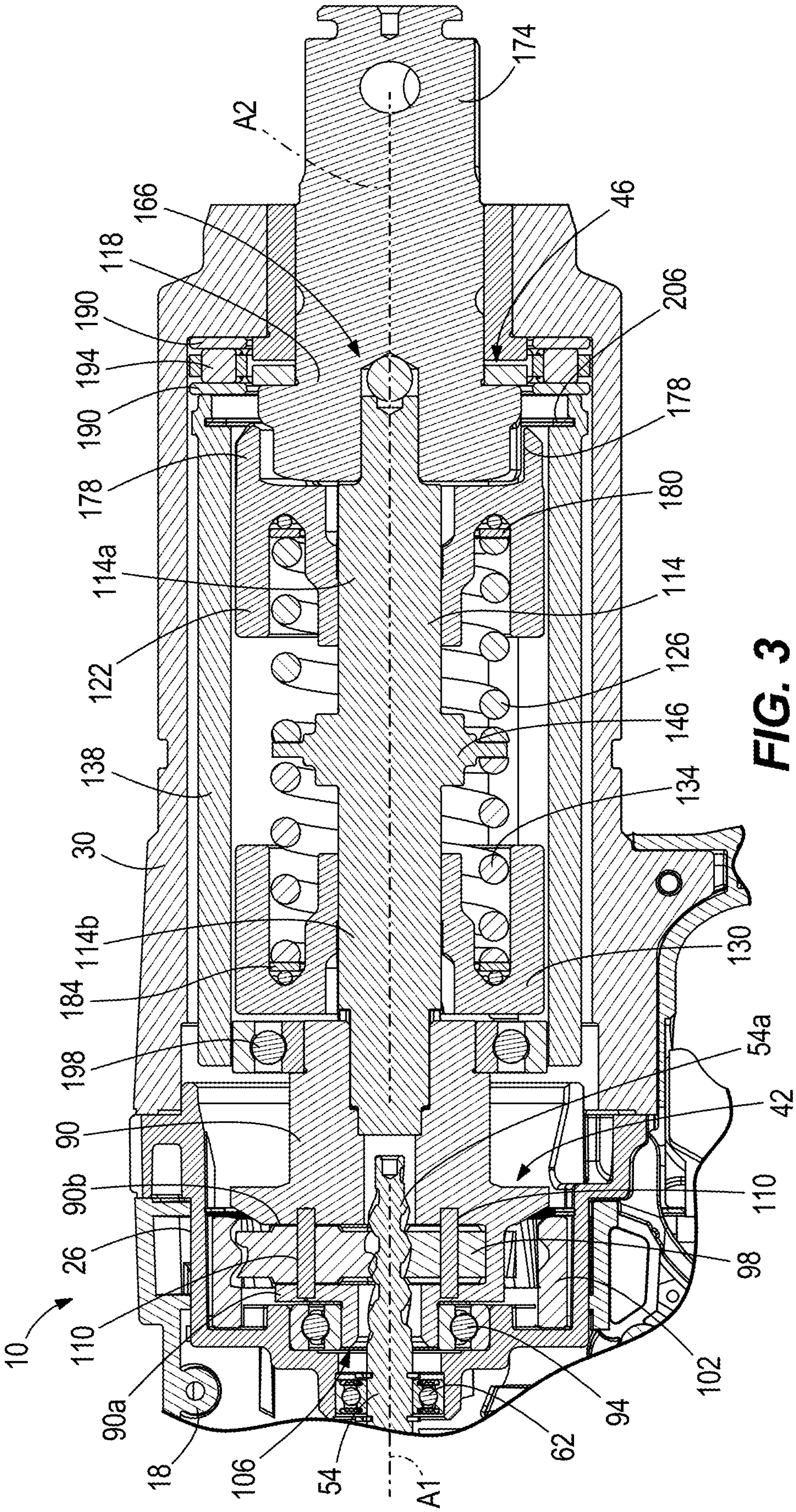
FIG. 3 is a zoomed-in view of a portion of the cross-sectional view of the power tool of FIG. 2.

As illustrated in FIGS. 2 and 3, the transmission assembly 42 includes a planet carrier 90, a planet carrier bearing 94, a plurality of planet gears 98, and a ring gear 102. The planet carrier 90 defines an aperture 106 that is configured to the receive a portion of the output shaft 54. The planet carrier bearing 94 is positioned at a rear end of the planet carrier 90 and supports the planet carrier 90 for rotation relative to the intermediate case 26. The planet carrier 90 supports the plurality of planet gears 98. Specifically, the planet carrier 90 includes a rear wall 90*a*, a front wall 90*b*, and a plurality of pins 110 extending between the rear wall 90*a* and the front wall 90*b* such that each of the planet gears 98 is mounted to a corresponding one of the pins 110. Each of the planet gears 98 includes gear teeth that are in meshed engagement with a pinion 54*a* of the output shaft 54 such that rotation of the output shaft 54 drives movement and rotation of the planet gears 98. Each of the planet gears 98 is also in meshed engagement with ring gear teeth that are formed on an inner surface of the ring gear 102. As such, the output shaft 54 is configured to drive the planet gears 98 to move around the inner surface of the ring gear 102, and the planet gears 98 are mounted to the pins 110 such that the movement of the planet gears 98 around the inner surface of the ring gear 102 drives rotation of the planet carrier 90. Therefore, the transmission assembly 42 is configured to provide a constant rotational force or torque at the planet carrier 90, such that, in the illustrated embodiment, the planet carrier 90 defines an output of the transmission assembly 42 (and, more generally, the drive assembly).

Figure 7:
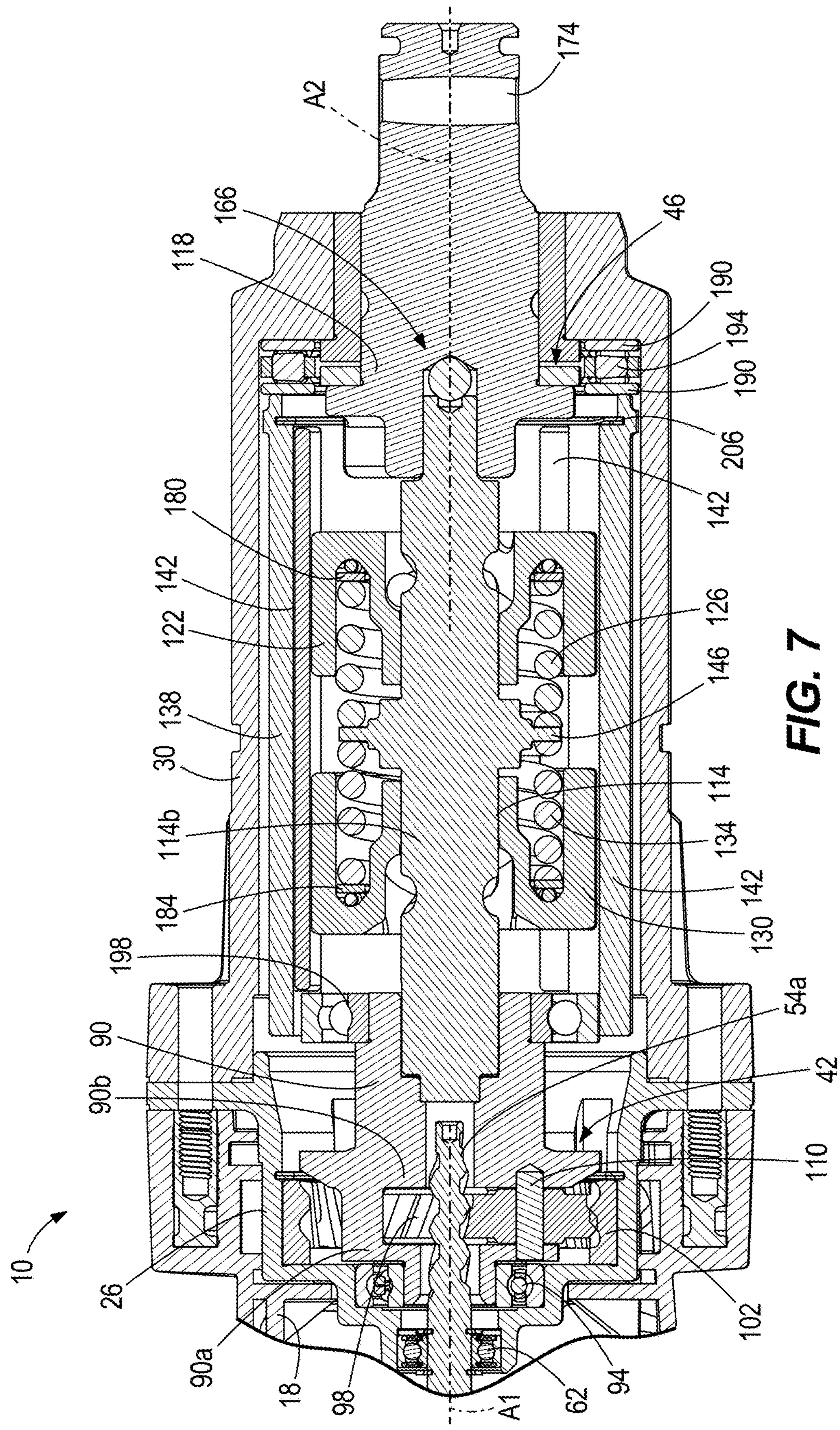
FIG. 7 is a zoomed-in view of a portion of the cross-sectional view of the power tool of FIG. 2 with the first mass and the second mass in a compressed position.

With reference to FIG. 3, the impact mechanism 46 is configured to convert the constant rotational force or torque provided by the transmission assembly 42 into a striking rotational force or intermittent applications of torque at the output end 10*a* of the impact tool 10 for application to the workpiece 5 (FIG. 2). The impact mechanism 46 includes a camshaft 114, an anvil 118, a first mass 122, a first mass spring 126, a second mass 130, a second mass spring 134, a cage 138, and a plurality of connecting pins 142 (FIG. 7).

Figure 4:
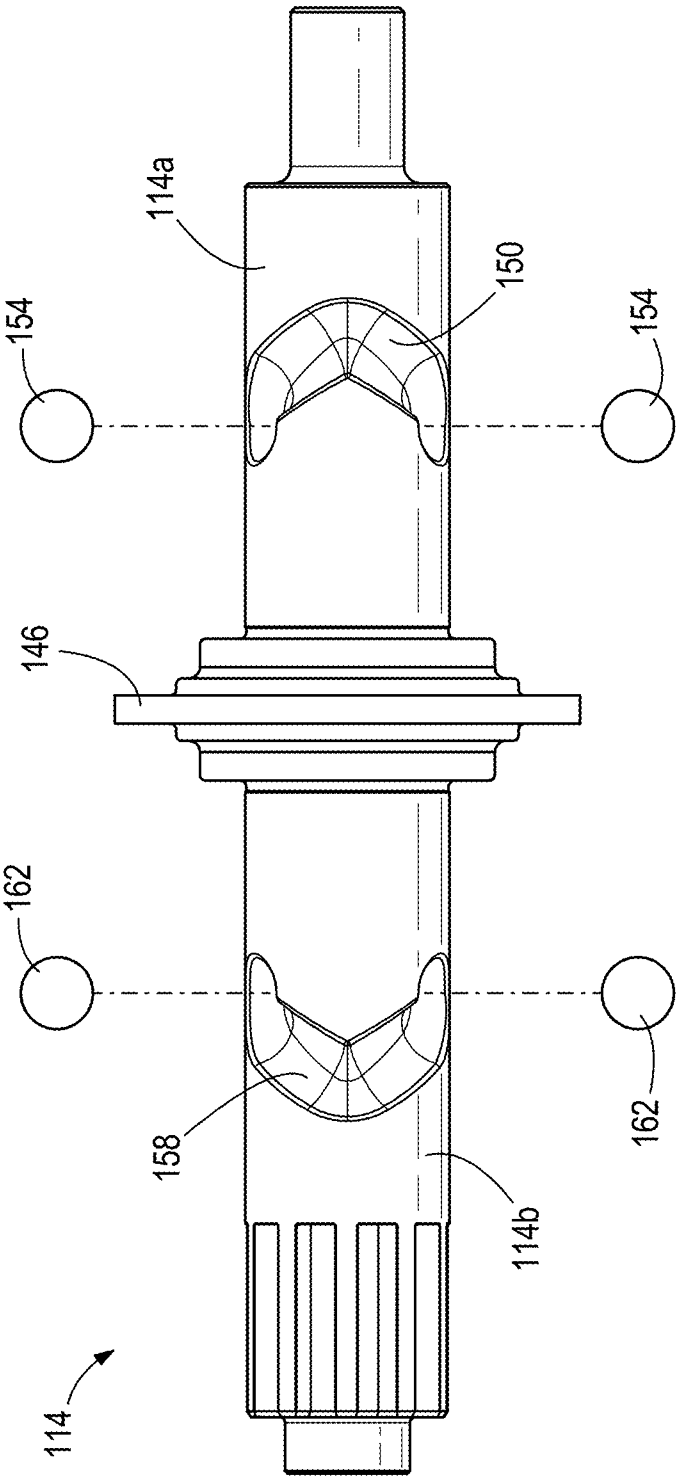
FIG. 4 is a plan view of a camshaft for the power tool of FIG. 1.

The camshaft 114 is coupled to the planet carrier 90, which defines an output of the drive assembly in the illustrated embodiment, such that the camshaft 114 is configured to rotate with the planet carrier 90. As illustrated in FIG. 4, the camshaft 114 includes a first camshaft portion 114*a*, a second camshaft portion 114*b*, and a center flange 146 positioned between the first camshaft portion 114*a* and the second camshaft portion 114*b*. With reference to FIGS. 3 and 4, the first camshaft portion 114*a* extends from the center flange 146 to the anvil 118, and the second camshaft portion 114*b* extends from the center flange 146 to the planet carrier 90. A first cam groove 150 is defined in the first camshaft portion 114*a* and is configured to receive a first cam ball 154 (FIG. 4). A second cam groove 158 is defined in the second camshaft portion 114*b* and is configured to receive a second cam ball 162. The first cam ball 154 may be one of a plurality of first cam balls 154, and the second cam ball 162 may be one of a plurality of second cam balls. In the illustrated embodiment, the first cam groove 150 and the second cam groove 158 are mirrored relative to each other, such that the center or apex of each cam groove 150, 158 extends toward an opposite end of the camshaft 114.

Figure 5A:
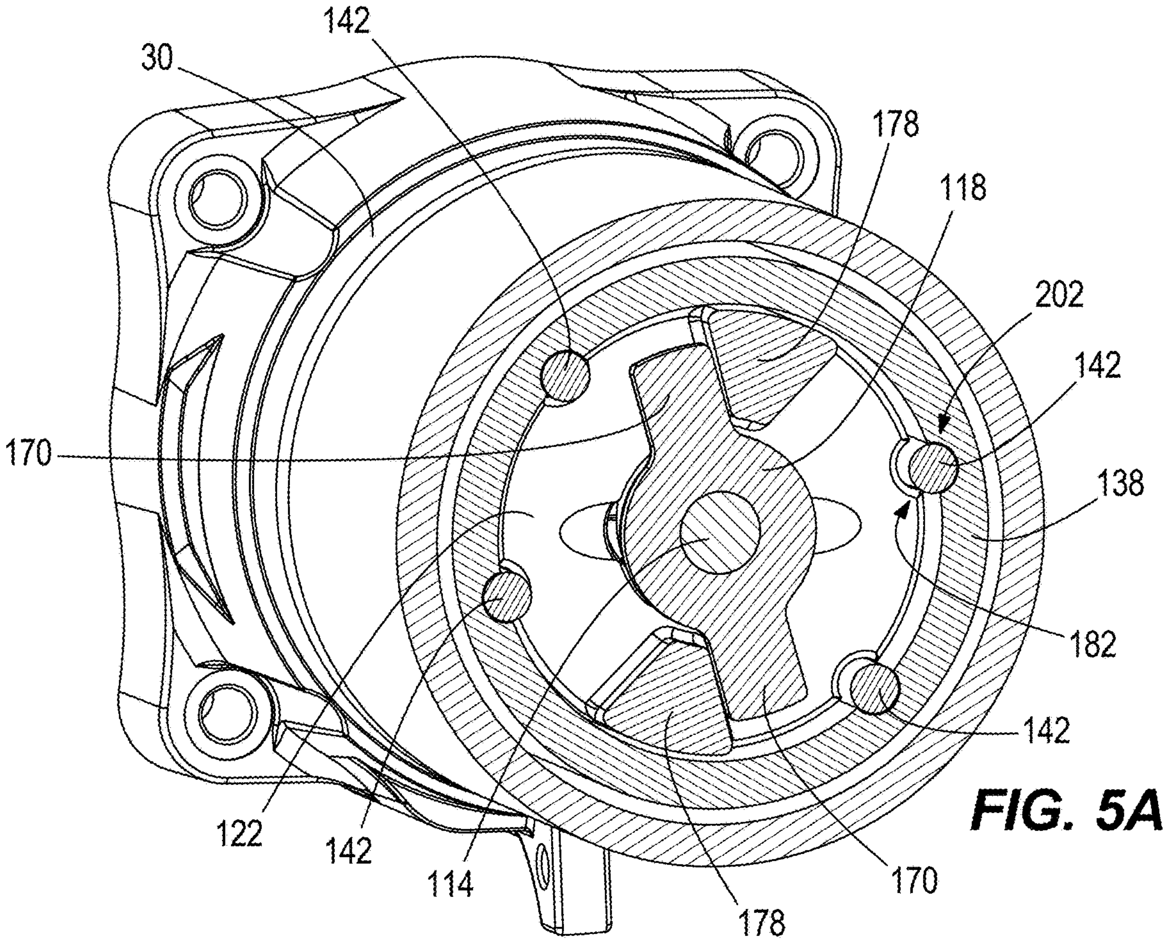
FIG. 5A is a cross-sectional view of the power tool of FIG. 1 taken along line 5-5 of FIG. 1.

With reference to FIGS. 3 and 5A, the anvil 118 defines an anvil aperture 166 that receives the camshaft 114 to couple the camshaft 114 to the anvil 118. As such, the camshaft 114 may be at least partially rotationally supported by the anvil 118. In the illustrated embodiment, the camshaft 114 is rotationally supported at its front end by the anvil 118 and at its rear end by the carrier 90.

The illustrated anvil 118 includes anvil lugs 170 and an output portion 174. The anvil lugs 170 are configured to receive a striking rotational force, or a rotational impact, from the first mass 122, as will be described in more detail with respect to operation of the impact mechanism 46. The output portion 174 extends from the anvil lugs 170 and out of the front housing portion 30. As such, the output portion 174 is configured to apply the striking rotational force or intermittent torque to the workpiece 5 (FIG. 2), for example, via a tool bit or the like coupled to the output portion 174. The output portion 174 defines an output axis A2 such that the output portion 174 is configured to drive rotation of and/or apply striking rotational force to the workpiece 5 (FIG. 2) about the output axis A2. In the illustrated embodiment, the motor axis A1 and the output axis A2 are coaxial. In other embodiments, the motor axis A1 and the output axis A2 may be offset from one another or perpendicular to one another.

Figure 5B:
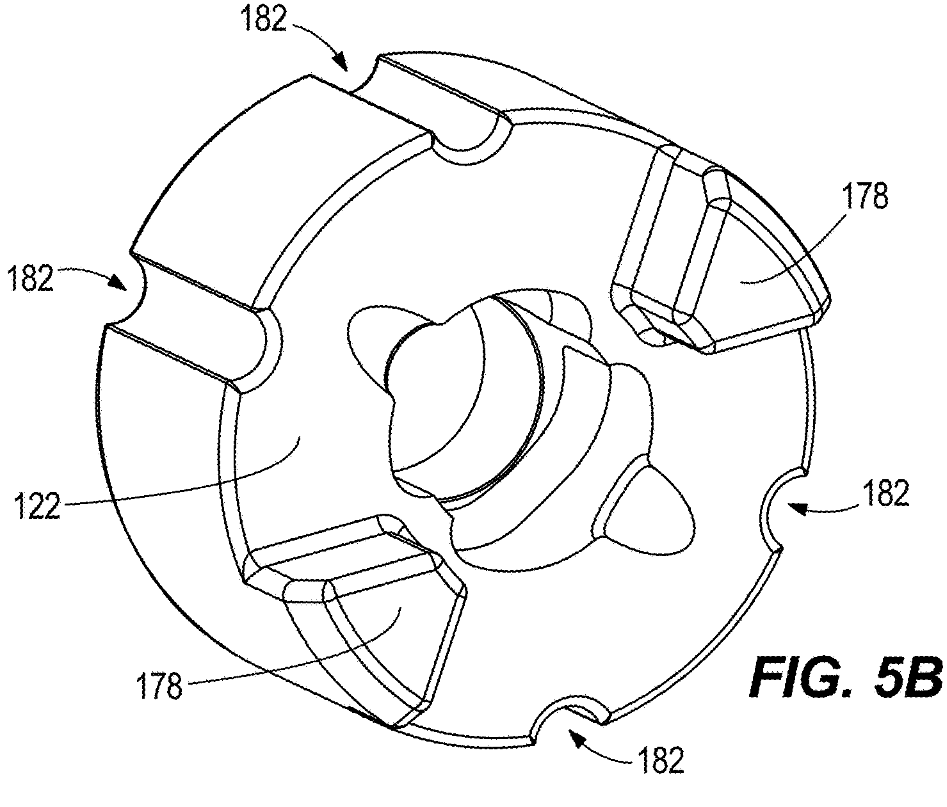
FIG. 5B is a perspective view of a first mass for the impact mechanism of the power tool of FIG. 1.

With continued reference to FIGS. 3, 5A, and 5B, the first mass 122 is coupled to the first camshaft portion 114*a* via the first cam balls 154 and first cam groove 150. The first mass 122 includes hammer lugs 178 that are configured to engage and impart a striking rotational force on the anvil lugs 170. The first mass spring 126 extends from the center flange 146 of the camshaft 114 to a first mass washer 180 supported by the first mass 122 and biases the first mass 122 toward the anvil 118. The first mass 122 defines a plurality of first mass grooves 182 in the outer surface of the first mass 122. Specifically, the first mass 122 defines four first mass grooves 182. Each of the first mass grooves 182 is configured to receive at least a portion of a corresponding one of the connecting pins 142. The first cam ball 154 (FIG. 4) is positioned in driving engagement with the first mass 122 such that movement of the first cam ball 154 (FIG. 4) within the first cam groove 150 (FIG. 4) allows for relative axial movement of the first mass 122 along the camshaft 114 and rotation of the first mass 122 relative to the camshaft. Specifically, when a threshold torque is applied to the anvil 118 (e.g., due to sufficient resistance on the anvil 118 from the workpiece 5), the first mass 122 is prevented from rotating due to its engagement with the anvil 118. The camshaft 114 continues to rotate relative to the first mass 122, causing the first mass 122 to retract away from the anvil 118 against the biasing force of the first spring 126. Once the first mass 122 retracts a sufficient distance for the lugs 178 of the first mass 122 to clear the anvil lugs 170, the first mass 122 is able to rotate relative to the anvil 118. The energy stored by the first spring 126 propels the first mass 122 along the camshaft 114 toward the anvil 118, and the shape of the cam groove 150 causes the first mass 122 to rotate as it moves axially toward the anvil 118. The lugs 178 on the first mass 122 then strike the anvil lugs 170 to deliver a rotational impact to the anvil 118 (and thus, to the workpiece 5). This process repeats during operation of the power tool 10 such that repeated, periodic rotational impacts are delivered to the anvil 118 to tighten or loosen the workpiece 5.

Figure 6A:
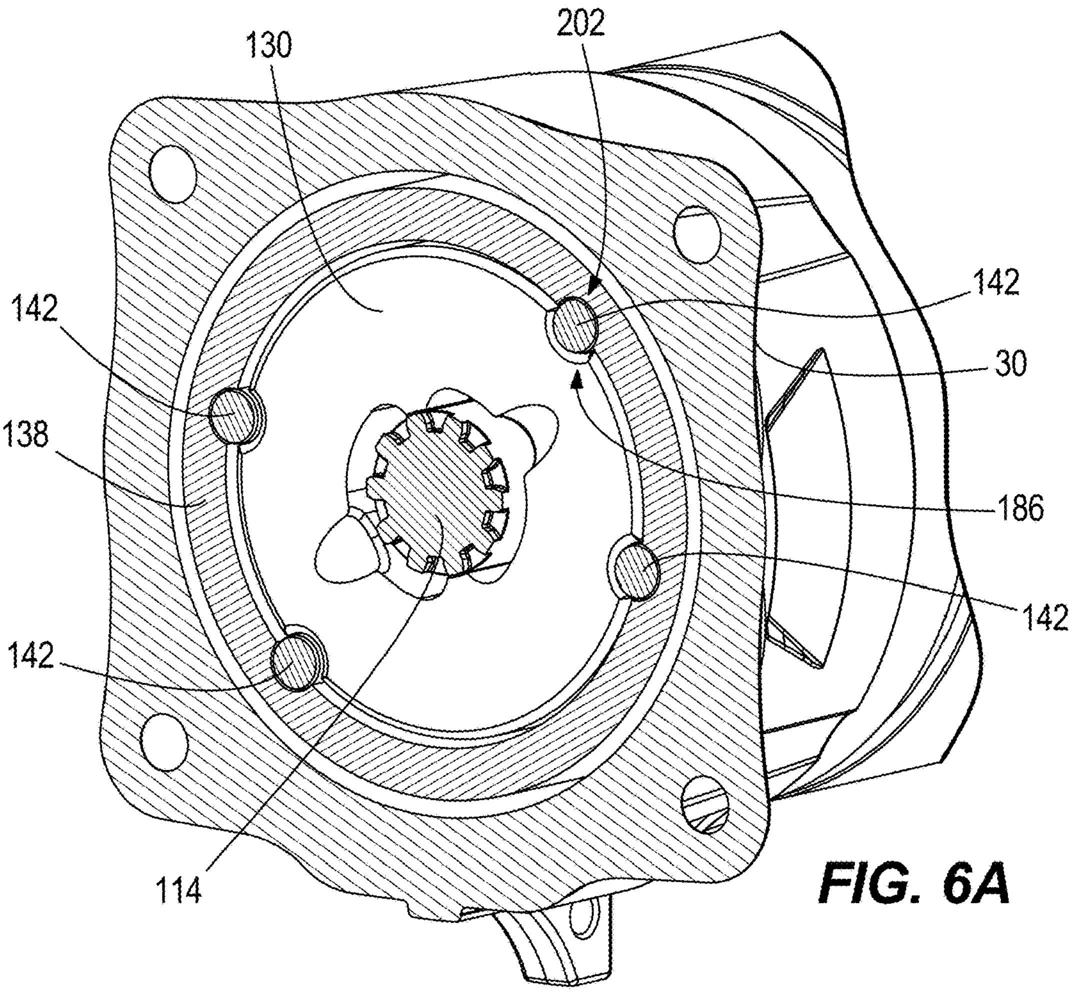
FIG. 6A is a cross-sectional view of the power tool of FIG. 1 taken along line 6-6 of FIG. 1.
Figure 6B:
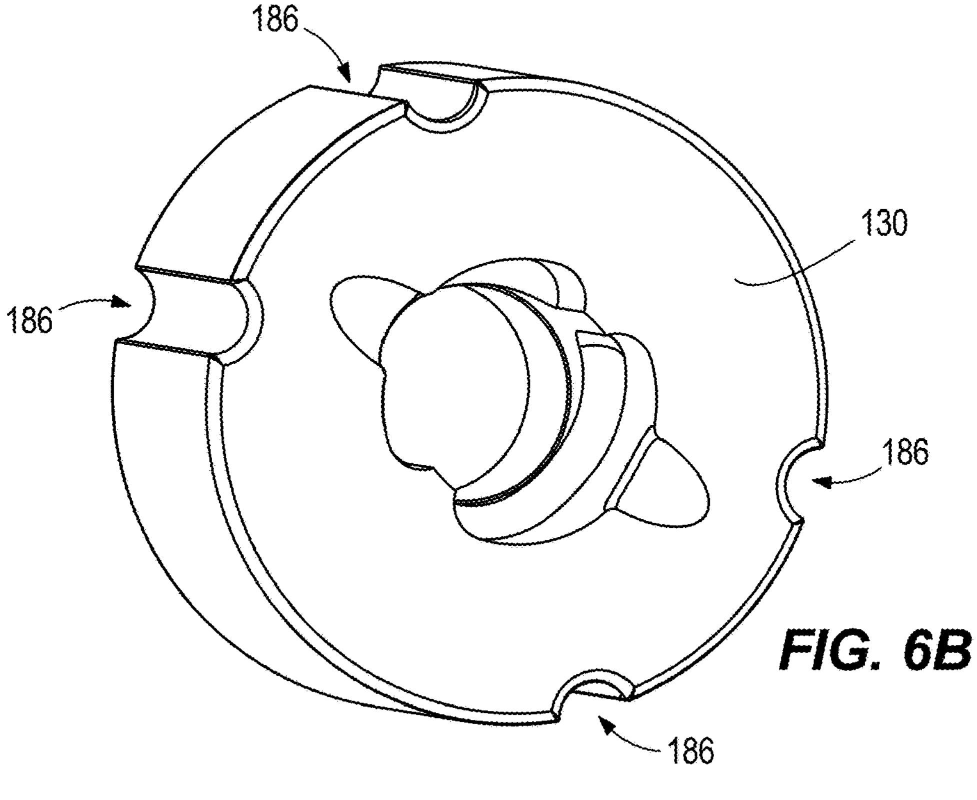
FIG. 6B is a perspective view of a second mass for the impact mechanism of the power tool of FIG. 1.

With reference to FIGS. 3, 6A, and 6B, the second mass 130 is coupled to the second camshaft portion 114*b* via the second cam balls 162 and second cam groove 158. In the illustrated embodiment, the second mass 130 does not include hammer lugs, and the second mass 130 does not directly strike an anvil. In other embodiments, the second mass 130 may have hammer lugs for striking an anvil. The second mass spring 134 extends from the center flange 146 of the camshaft 114 to a second mass washer 184 supported by the second mass 130 and biases the second mass 130 toward the planet carrier 90. As such, the first mass spring 126 and the second mass spring 134 bias the first mass 122 and the second mass 130, respectively, in opposite directions. The second mass 130 defines a plurality of second mass grooves 186 in the outer surface of the second mass 130. Specifically, the second mass 130 defines four second mass grooves 186. Each of the second mass grooves 186 is configured to receive at least a portion of a corresponding one of the connecting pins 142. The connecting pins 142 thus couple the first mass 122 and the second mass 130 together for co-rotation.

The second cam ball 162 (FIG. 4) is positioned in driving engagement with the second mass 130 such that movement of the second cam ball 162 (FIG. 4) within the second cam groove 158 (FIG. 4) allows for relative axial movement of the second mass 130 along the camshaft 114. The second mass 130 is configured to reciprocate along the camshaft 114 opposite the first mass 122 (that is, mirror movement of the first mass 122) to at least partially compensate vibrations caused by reciprocation of the first mass 122.

As illustrated in FIG. 3, the cage 138 surrounds both the first mass 122 and the second mass 130. Specifically, a rearward end of the cage 138 is mounted to the planet carrier 90, and a forward end of the cage 138 is supported by a thrust washer 190 and a roller bearing 194 at a position adjacent to the anvil 118. Each of the first mass 122 and the second mass 130 is mounted to the camshaft 114 at a position between the planet carrier 90 and the thrust washer 190. The rear end of the cage 138 is mounted to the planet carrier 90 with a cage bearing 198 positioned therebetween such that the planet carrier 90 and the cage 138 are configured to rotate relative to one another. With reference to FIGS. 3, 5A, and 6A, the cage 138 defines a plurality of cage grooves 202 in the inner surface of the cage 138. Specifically, the cage 138 defines four cage grooves 202. Each of the cage grooves 202 is configured to receive at least a portion of a corresponding one of the connecting pins 142. In some embodiments, a bearing may be positioned between the cage 138 and the front housing portion 30 to radially support the cage 138 relative to the front housing portion 30.

With reference to FIGS. 5A, 6A, and 7, in the illustrated embodiment, the impact mechanism 46 includes four connecting pins 142. The connecting pins 142 extend from the cage bearing 198 at the rear end of the cage 138 to a retaining ring 206 that is positioned rearward of the thrust washer 190 at the forward end of the cage 138. The connecting pins 142 are positioned between the first mass 122 and the cage 138 and between the second mass 130 and the cage 138. Specifically, each of the connecting pins 142 is received in a corresponding one of each of the first mass grooves 182, the second mass grooves 186, and the cage grooves 202. Due to the engagement between the connecting pins 142 and each of the first mass 122, the second mass 130, and the cage 138, the connecting pins 142 constrain, or lock, the first mass 122, the second mass 130, and the cage 138 for rotation with each other. Stated another way, the first mass 122, the second mass 130, and the cage 138 are constrained for co-rotation with each other. Additionally, the engagement between the connecting pins 142 and each of the first mass 122, the second mass 130, and the cage 138 enables axial movement, or translation, of the first mass 122 and the second mass 130 relative to the cage 138.

With reference to FIGS. 1 and 2, to operate the impact tool 10, a user may grasp the grip 38 defined by the handle housing portion 22 and actuate (e.g., squeeze) the switch 86 to begin supplying electricity to the motor 50 from the battery 82. Specifically, actuation of the switch 86 sends a signal to the PCBA 56 to energize the motor 50 so that the motor 50 begins to rotate. As the motor 50 rotates, the motor 50 drives rotation of the output shaft 54 which is engaged with the planet gears 98 of the transmission assembly 42. The planet gears 98 drive rotation of the planet carrier 90, which in turn, drives rotation of the camshaft 114 in a first rotational direction D1. With reference to FIG. 3, under a no-load condition, in which the output portion 174 of the anvil 118 is not engaged with a workpiece, the camshaft 114 drives constant rotation of the first mass 122, the second mass 130, and the cage 138. The hammer lugs 178 of the first mass 122 may engage the anvil lugs 170 (FIG. 5A) of the anvil 118 to drive constant rotation of the output portion 174.

Figure 8:
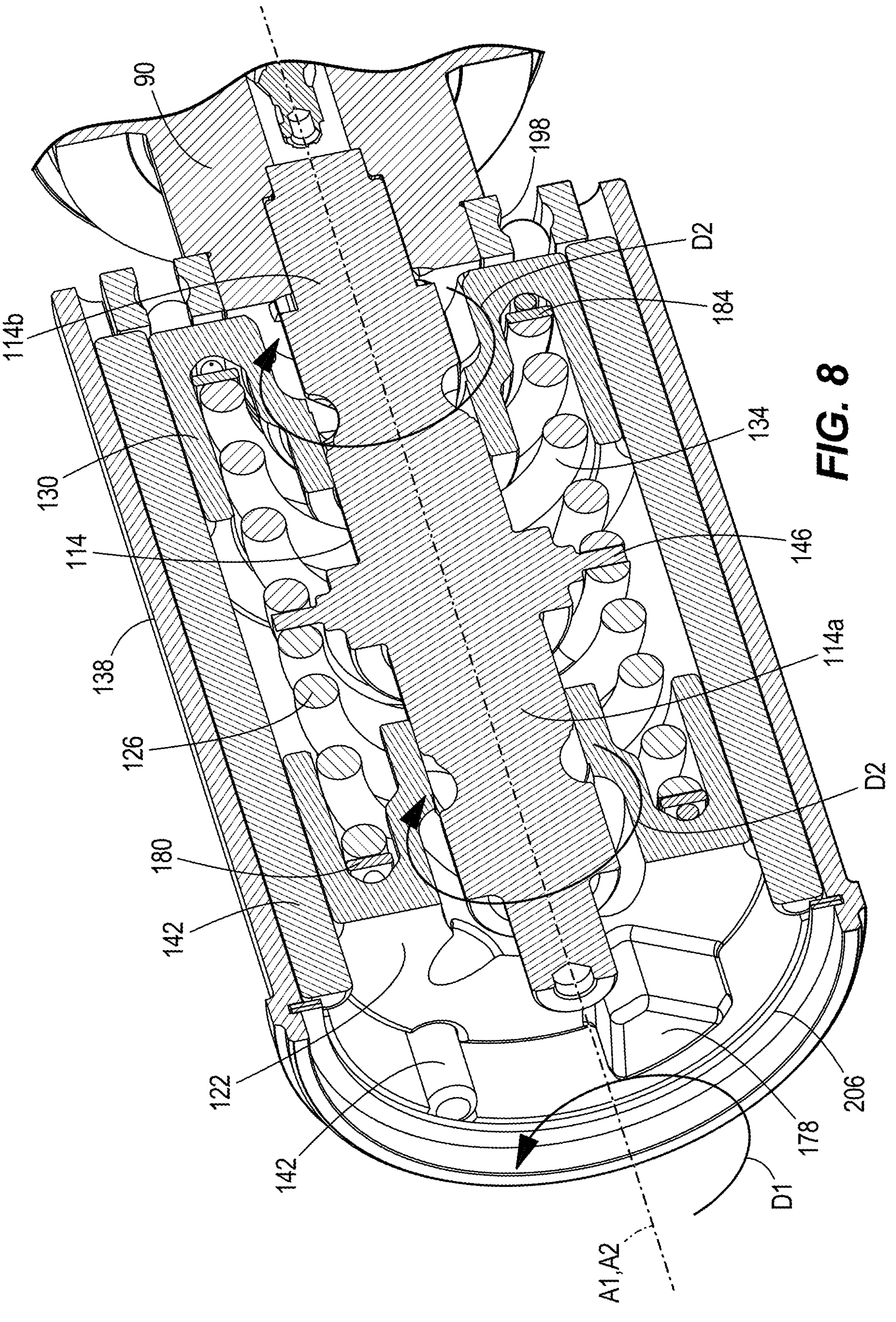
FIG. 8 is a three-quarter section view of a portion of an impact mechanism for the power tool of FIG. 1.

With reference to FIGS. 3, 7, and 8, one the anvil 118 encounters sufficient resistance (e.g., above a threshold torque), the first mass 122 is prevented from rotating due to its engagement with the anvil 118. The camshaft 114 continues to rotate relative to the first mass 122, causing the first mass 122 to retract away from the anvil 118 against the biasing force of the first spring 126. Once the first mass 122 retracts a sufficient distance for the lugs 178 of the first mass 122 to clear the anvil lugs 170, the first mass 122 is able to rotate relative to the anvil 118. The energy stored by the first spring 126 propels the first mass 122 along the camshaft 114 toward the anvil 118, and the shape of the cam groove 150 causes the first mass 122 to rotate as it moves axially toward the anvil 118. The lugs 178 on the first mass 122 then strike the anvil lugs 170 to deliver a rotational impact to the anvil 118 (and thus, to the workpiece 5). This process repeats during operation of the power tool 10 until the working operation is complete.

During the load condition, the second mass 130 is configured to mirror the movements of the first mass 122. Specifically, the engagement between the connecting pins 142 and each of the first mass 122, the second mass 130, and the cage 138 locks the second mass 130 and the cage 138 for rotation with the first mass 122. As such, once the first mass 122 begins to rotate in the second rotational direction D2 relative to the camshaft 114 (or, in other words, the camshaft 114 begins to rotate in the first direction D1 relative to the first mass 122), the first mass 122 drives the second mass 130 to also rotate in the second rotational direction D2 via the connecting pins 142. As the second mass 130 rotates in the second rotational direction D2, the second cam ball 162 (FIG. 4) will drive axial movement of the second mass 130 relative to the camshaft 114 in a direction away from the planet carrier 90 (e.g., a forward direction), thereby compressing the second mass spring 134. The first cam groove 150 (FIG. 4) and the second cam groove 158 (FIG. 4) are mirrored such that the second cam ball 162 (FIG. 4) will reach a forward end of the second cam groove 158 (FIG. 4) at the same time that the first cam ball 154 (FIG. 4) reaches the rearward end of the first cam groove 150 (e.g., as illustrated in FIG. 7). At this time, the first mass 122 begins to rotate in the first rotational direction D1 again (i.e., in the same direction as the camshaft 114) and drives the second mass 130 to also rotate in the first rotational direction D1 via the connecting pins 142. Additionally at this time, the second mass spring 134 applies a biasing force on the second mass 130 that pushes the second mass 130 toward the planet carrier 90 synchronously with the biasing force applied by the first mass spring 126 to the first mass 122.

As such, the impact mechanism 46 is configured to reduce the vibrations felt by a user during operation of the impact tool 10. Specifically, the biasing force applied by the first mass spring 126 to the first mass 122 causes a quick axial movement of the first mass 122 toward the anvil 118. This quick axial movement creates, or generates, an axial vibration along the camshaft 114 that may ultimately be felt by a user's hand grasping the grip 38 of the handle housing portion 22 during operation of the impact tool 10. However, the second mass 130 acts as a counterweight that cancels the axial vibration generated by the first mass 122. Specifically, the second mass 130 may have substantially the same mass as the first mass 122, and the second mass spring 134 may have substantially the same spring characteristics as the first mass spring 126, such that the biasing force applied by the second mass spring 134 to the second mass 130 causes a quick axial movement of the second mass 130 toward the planet carrier 90. This quick axial movement causes, or generates, an axial vibration along the camshaft 114 that may be equal and opposite to the axial vibration generated by the first mass 122 and the first mass spring 126. Similarly, when the first mass 122 retracts against the first mass spring 126 the second mass 130 may also retract against the second mass spring 134 at the same rate. Therefore, when the vibrations caused by reciprocation of the respective masses 122, 130 meet, the result may be an approximately net zero-magnitude vibration on the camshaft 114 such that substantially less vibration is transferred from the impact mechanism 46 to other parts of the impact tool 10, such as the grip 38. As such, the second mass 130 may advantageously, among other things, improve the comfort of use of the impact tool 10 for the user relative to prior impact mechanisms.

During operation, the impact mechanism 46 may also increase the torque that the impact tool 10 can apply to a workpiece relative to prior impact mechanisms. Specifically, in the illustrated embodiment, the added mass of the second mass 130 and the cage 138 during impact between the hammer lugs 178 and the anvil lugs 170 increases the amount of torque that the output portion 174 of the anvil 118 can apply to the workpiece 5 (FIG. 2). For example, a prior art power tool may only be able to apply a torque proportional to the mass of a single hammer, whereas the impact tool 10 of the disclosed embodiment is able to apply torque that is proportional to the mass of the sum of the two hammers 122, 130 and the cage 138. Therefore, the resultant torque applied by the output portion 174 of the impact mechanism 46 will be higher than the torque applied by an impact mechanism that does not have the connection between multiple hammers and a cage.

An embodiment of the impact tool 10 was tested and found to have a total hand arm vibration $a_{ht}$ measured at the grip 38 of less than 10 m/s$^2$ while the impact tool 10 was producing forty impacts per second (i.e., an impacting frequency of 40 hz). As defined herein, the total hand arm vibration $a_{ht}$ is the root sum-of-squares of the acceleration components in the x-direction $a_{hx}$, the acceleration in the y-direction $a_{hy}$, and the acceleration in the z-direction, $a_{hz}$. Thus, the total hand arm vibration $a_{ht}$ is defined by the following equation:

$$a_{ht} = \sqrt{a_{hx}^2 + a_{hy}^2 + a_{hz}^2} \quad \text{Equation 1}$$

The three axial acceleration components were measured by an accelerometer placed on the trigger finger of the user's hand grasping the grip 38 and operating the impact tool 10. In other embodiments, the impact tool 10 may have a total hand arm vibration $a_{ht}$ measured at the grip 38 between 2 m/s$^2$ and 12 m/s$^2$ when operating at an impacting frequency between 20 hz and 60 hz. In other embodiments, the impact tool 10 may have a total hand arm vibration $a_{ht}$ measured at the grip 38 between 4 m/s$^2$ and 10 m/s$^2$ when operating at an impacting frequency between 30 hz and 50 hz. In other embodiments, the impact tool 10 may have a total hand arm vibration $a_{ht}$ measured at the grip 38 between 4 m/s$^2$ and 10 m/s$^2$ when operating at an impacting frequency between 35 hz and 45 hz. In other embodiments, the impact tool 10 may have a total hand arm vibration $a_{ht}$ measured at the grip 38 between 5 m/s$^2$ and 9 m/s$^2$ when operating at an impacting frequency between 35 hz and 45 hz. In other embodiments, the impact tool 10 may have a total hand arm vibration $a_{ht}$ measured at the grip 38 between 6 m/s$^2$ and 8 m/s$^2$ when operating at an impacting frequency between 35 hz and 45 hz.

The impact tool 10 was also tested for total hand arm vibration $a_{ht}$ as a function of fastening torque. The term "fastening torque" means torque applied to a fastener in a direction increasing tension (i.e. in a tightening direction). In some embodiments, the impact tool 10 may produce a total hand arm vibration $a_{ht}$ of 1 g (i.e. 9.8 m/s$^2$) or less when producing at least 2,000 ft-lbs of fastening torque. In some embodiments, the impact tool 10 may produce a total hand arm vibration $a_{ht}$ of 0.8 g (i.e. 7.84 m/s$^2$) or less when producing at least 2,000 ft-lbs of fastening torque. In some embodiments, the impact tool 10 may produce a total hand arm vibration ht of 1 g (i.e. 9.8 m/s$^2$) or less per 2,000 ft-lbs of fastening torque. In some embodiments, the impact tool 10 may produce a total hand arm vibration $a_{ht}$ of 0.5 g (i.e. 4.9 m/s$^2$) or less per 1,000 ft-lbs of fastening torque. In some embodiments, the impact tool 10 may produce a total hand arm vibration $a_{ht}$ between 0.4 g and 1 g when producing at least 1,000 ft-lbs of fastening torque. In some embodiments, the impact tool 10 may produce a total hand arm vibration $a_{ht}$ between 0.4 g and 1 g when producing between 1,000 ft-lbs and 2,000 ft-lbs of fastening torque. In some embodiments, the impact tool 10 may produce a total hand arm vibration $a_{ht}$ between 0.4 g and 0.8 g when producing between 1,000 ft-lbs and 2,000 ft-lbs of fastening torque. In some embodiments, the impact tool 10 may produce a total hand arm vibration $a_{ht}$ between 0.4 g and 0.8 g when producing between 1,200 ft-lbs and 2,000 ft-lbs of fastening torque. In some embodiments, the impact tool 10 may produce a total hand arm vibration $a_{ht}$ between 0.6 g and 0.8 g when producing between 1,500 ft-lbs and 2,000 ft-lbs of fastening torque. In some embodiments, the impact tool 10 may produce a total hand arm vibration $a_{ht}$ between 0.6 g and 1 g when producing between 1,500 ft-lbs and 2,000 ft-lbs of fastening torque.

In contrast, an impact tool without a counter mass may produce a total hand arm vibration $a_{ht}$ of about 30 m/s$^2$ when producing 2,000 ft-lbs of fastening torque-more than three times greater in some cases than the total hand arm vibration $a_{ht}$ observed with embodiments of the impact tool 10. Thus, embodiments of the impact tool 10 may advantageously provide a relatively high fastening torque with relatively little vibration being transmitted back to the user, thereby improving user comfort and reducing fatigue.

Figure 9:
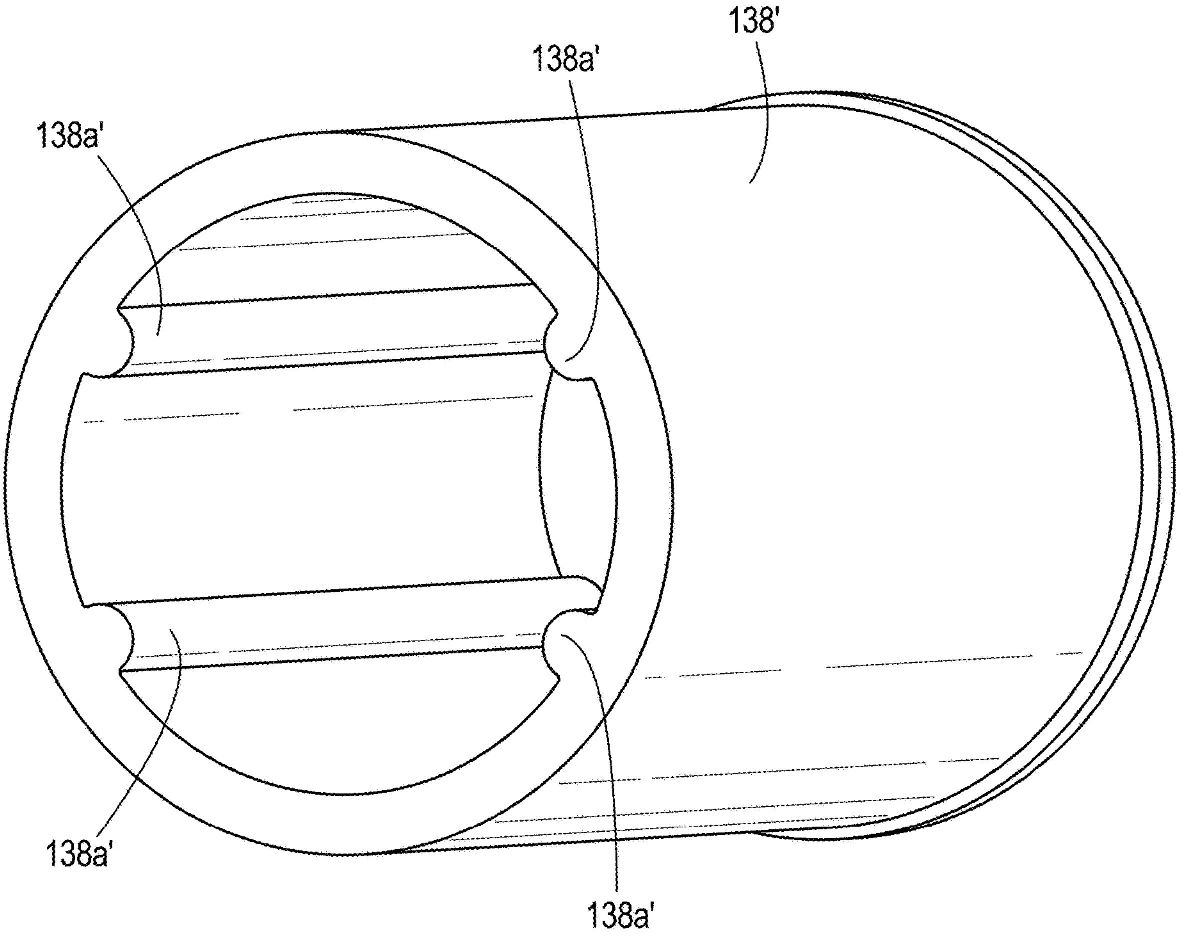
FIG. 9 is a perspective view of a cage according to an embodiment of the disclosure.

FIG. 9 illustrates an embodiment of a cage 138' according to another embodiment of the disclosure. The cage 138' may be configured for use with the impact mechanism 46 of FIG. 3. The cage 138' is substantially similar to the cage 138 of FIG. 3, except that the cage 138' of FIG. 9 includes a plurality of cage protrusions **138*a*' rather than the cage grooves 202 of FIGS. 5A and 6A. As such, each of the cage protrusions 138*a*' is received in a corresponding one of the first mass grooves 182 and in a corresponding one of the second mass grooves 186 to rotationally lock the first mass 122 (FIG. 3), the second mass 130 (FIG. 3), and the cage 138' together. Additionally, the engagement between the cage protrusions 138*a*' and the first mass 122 (FIG. 3) and the second mass 130 (FIG. 3) enables axial movement of the first mass 122 (FIG. 3) and the second mass 130 (FIG. 3) relative to the cage 138'. In such embodiments, the cage protrusions 138*a*' may be used in place of the connecting pins 142 of FIG. 4 such that the impact mechanism 46 does not include separate components for rotationally and axially constraining the first mass 122 and the second mass 130**, as described herein.

Figure 10:
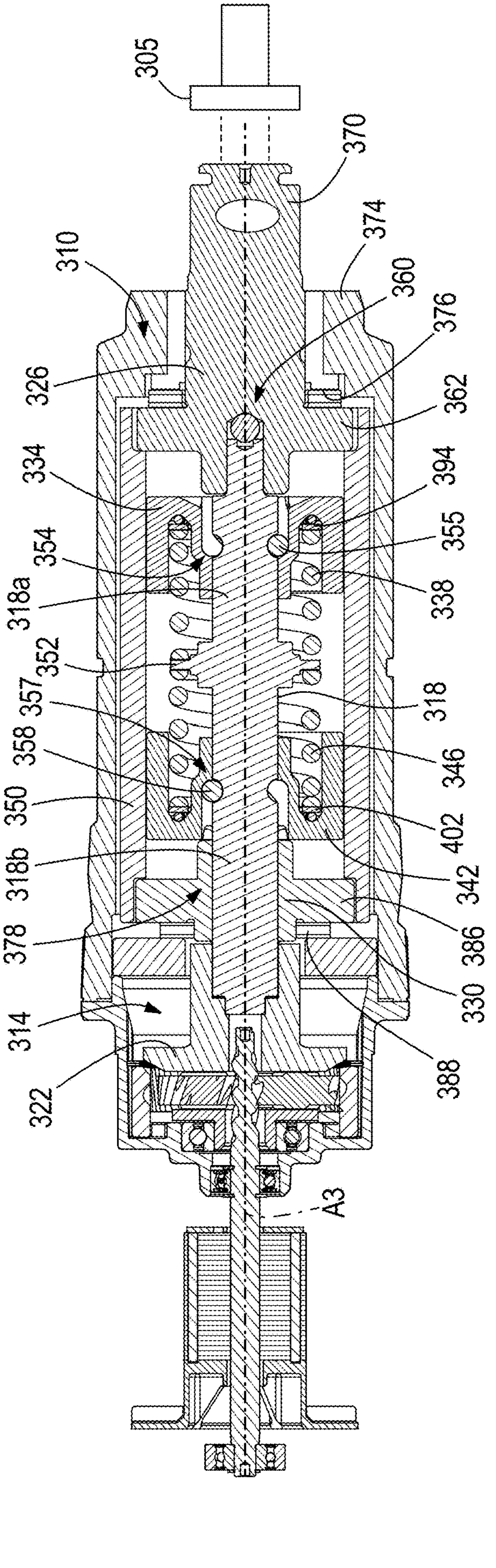
FIG. 10 is a perspective view of an impact mechanism, according to another embodiment of the disclosure, with a first mass and a second mass in a first position.

FIG. 10 illustrates an impact mechanism 310 according to another embodiment of the disclosure. The impact mechanism 310 may be configured for use with the power tool 10 of FIG. 1. In other embodiments, the impact mechanism 310 may be configured for use with a different power tool. The impact mechanism 310 of FIG. 10 may be substantially similar to the impact mechanism 46 of FIG. 3 except for the differences described herein. As such, the impact mechanism 310 of FIG. 10 is configured to convert constant rotational force and/or torque provided by a transmission assembly 314 into a striking rotational force or intermittent applications of torque. As illustrated in FIG. 10, the impact mechanism 310 includes a camshaft 318 that is coupled with a planet carrier 322 of the transmission assembly 314, a first anvil 326, a second anvil 330, a first mass 334, a first mass spring 338, a second mass 342, a second mass spring 346, and a cage 350.

The camshaft 318 is coupled to the planet carrier 322 of the transmission assembly 314 such that the camshaft 318 is configured to rotate with the planet carrier 322. As illustrated in FIG. 10, the camshaft 318 includes a first camshaft portion **318*a*, a second camshaft portion 318*b*, and a center flange 352 positioned between the first camshaft portion 318*a* and the second camshaft portion 318*b*. The first camshaft portion 318*a* extends from the center flange 352 to the first anvil 326, and the second camshaft portion 318*b* extends from the center flange 352 to the planet carrier 322. The camshaft 318 defines a first cam groove 354 in the first camshaft portion 318*a* that is configured to receive a first cam ball 355 and defines a second cam groove 357 in the second camshaft portion 318*b* that is configured to receive a second cam ball 358. The first cam groove 354, the first cam ball 355, the second cam groove 357, and the second cam ball 358 may be substantially similar to the first cam groove 150, the first cam ball 154, the second cam groove 158, and the second cam ball 162 of FIG. 4**.

Figure 11:
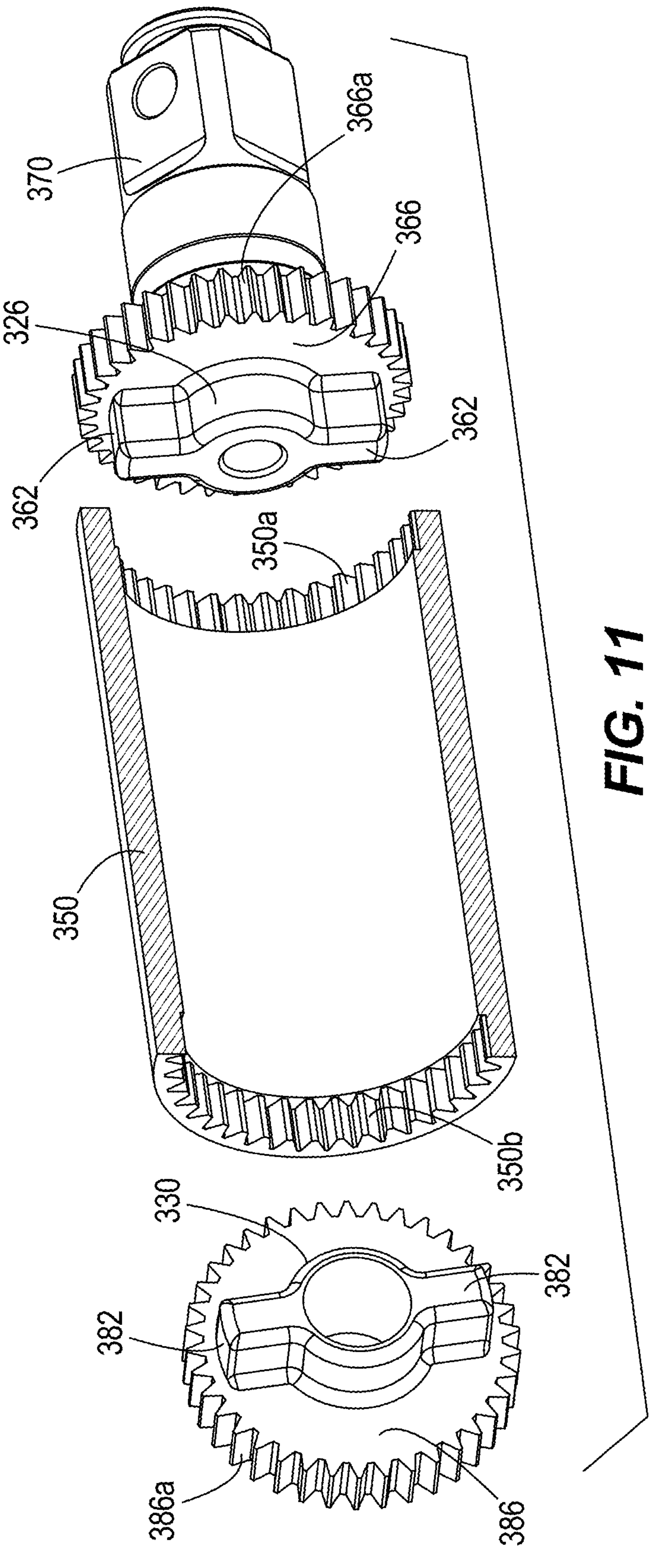
FIG. 11 is an exploded view of a first anvil, a second anvil, and a cage for the impact mechanism of FIG. 10.

With reference to FIGS. 10 and 11, the first anvil 326 defines a first anvil aperture 360 that receives the camshaft 318 to couple the camshaft 318 to the first anvil 326. As such, the camshaft 318 may drive constant rotation of the first anvil 326 under a no-load condition, as will be described in more detail. The first anvil 326 includes first anvil lugs 362, a first anvil flange 366, and an output portion 370. The first anvil lugs 362 are configured to receive a striking rotational force from the first mass 334, as will be described in more detail with respect to operation of the impact mechanism 310. The first anvil flange 366 includes a plurality of first anvil gear teeth **366*a* formed on an outer circumference of the first anvil flange 366. The output portion 370 extends from the first anvil flange 366 and out of a front housing portion 374. As such, the output portion 370 is configured to engage a workpiece 305 for applying the constant rotational torque and/or the striking rotational force to the workpiece 305. A first roller 376 is positioned between the first anvil 326 and the first housing portion 374 to support the anvil 326 for rotation relative to the first housing portion 374. The output portion 370 defines an output axis A3 such that the output portion 370 is configured to drive rotation of or apply striking rotational force to the workpiece 305** about the output axis A3.

The second anvil 330 defines a second anvil aperture 378 that receives the camshaft 318 to mount the second anvil 330 to the camshaft 318. As such, the camshaft 318 may drive constant rotation of the second anvil 330 under a no-load condition, as will be described in more detail. The second anvil 330 includes second anvil lugs 382 and a second anvil flange 386. The second anvil lugs 382 are configured to receive a striking rotational force from the second mass 342, as will be described in more detail with respect to operation of the impact mechanism 310. The second anvil flange 386 includes a plurality of second anvil gear teeth **386*a* formed on an outer circumference of the second anvil flange 386. A second roller 388 may be mounted to a rear side of the second anvil flange 386 to support relative rotation of the anvil 330**.

Figure 12:
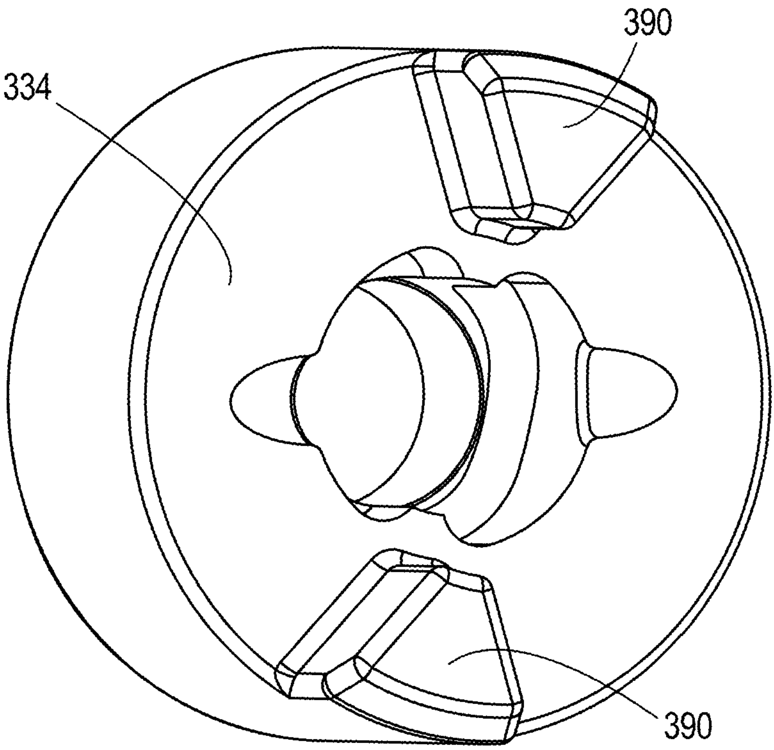
FIG. 12 is a perspective view of a first mass for the impact mechanism of FIG. 10.

With reference to FIGS. 10 and 12, the first mass 334 is mounted to the first camshaft portion **318*a*. The first mass 334 includes first mass lugs 390 (FIG. 12) that are configured to engage and impart a striking rotational force on the first anvil lugs 362 of the first anvil 326 and a first mass washer 394. The first mass spring 338 extends from the center flange 352 of the camshaft 318 to the first mass washer 394 and biases the first mass 334 toward the first anvil 326. The first cam ball 355 is positioned in driving engagement with the first mass 334 such that movement of the first cam ball 355 within the first cam groove 354 allows for relative axial movement of the first mass 334 along the camshaft 318. Specifically, the first mass 334 is configured to move axially along the camshaft to intermittently apply the striking rotational force on the first anvil 326**.

Figure 13:
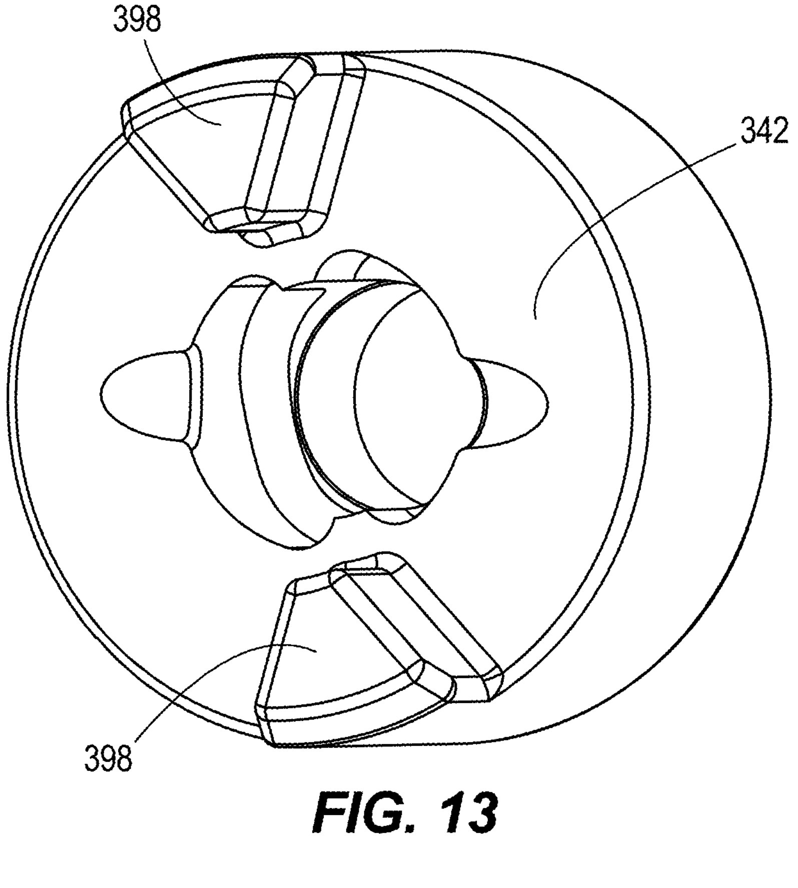
FIG. 13 is a perspective view of a second mass for the impact mechanism of FIG. 10.

The second mass 342 is mounted to the second camshaft portion **318*b*. The second mass 342 includes second mass lugs 398 (FIG. 13) that are configured to engage and impart a striking rotational force on the second anvil lugs 382 of the second anvil 330 and a second mass washer 402. The second mass spring 346 extends from the center flange 352 of the camshaft 318 to the second mass washer 402 and biases the second mass 342 toward the second anvil 330. The second cam ball 358 is positioned in driving engagement with the second mass 342 such that movement of the second cam ball 358 within the second cam groove 357 allows for relative axial movement of the second mass 342 along the camshaft 318. Specifically, the second mass 342 is configured to move axially along the camshaft 318 to intermittently apply the striking rotational force on the second anvil 330. In the illustrated embodiment, the second mass 342 is identical to the first mass 334 and faces an opposite direction than the first mass 334. Specifically, the first mass 334 faces a forward end of the impact mechanism 310, and the second mass 342 faces a rearward end of the impact mechanism 310. In other embodiments, the first mass 334 and the second mass 342** may be different.

With reference to FIGS. 10 and 11, the cage 350 surrounds both of the first mass 334 and the second mass 342. The cage 350 includes first mass cage gear teeth 350*a* on an inner surface of the cage 350 at a forward end of the cage 350 and second mass cage gear teeth 350*b* on an inner surface of the cage 350 at a rearward end of the cage 350. The first mass cage gear teeth 350*a* are meshed with the first anvil gear teeth 366*a* of the first anvil 326 to mount the cage 350 to the first anvil 326 and rotationally lock the cage 350 with the first anvil 326. The second mass cage gear teeth 350*b* are meshed with the second anvil gear teeth 386*a* of the second anvil 330 to mount the cage 350 to the second anvil 330 and rotationally lock the cage 350 with the second anvil 330. As such, the first anvil 326, the second anvil 330, and the cage 350 are all configured to rotate together.

Figure 14A:
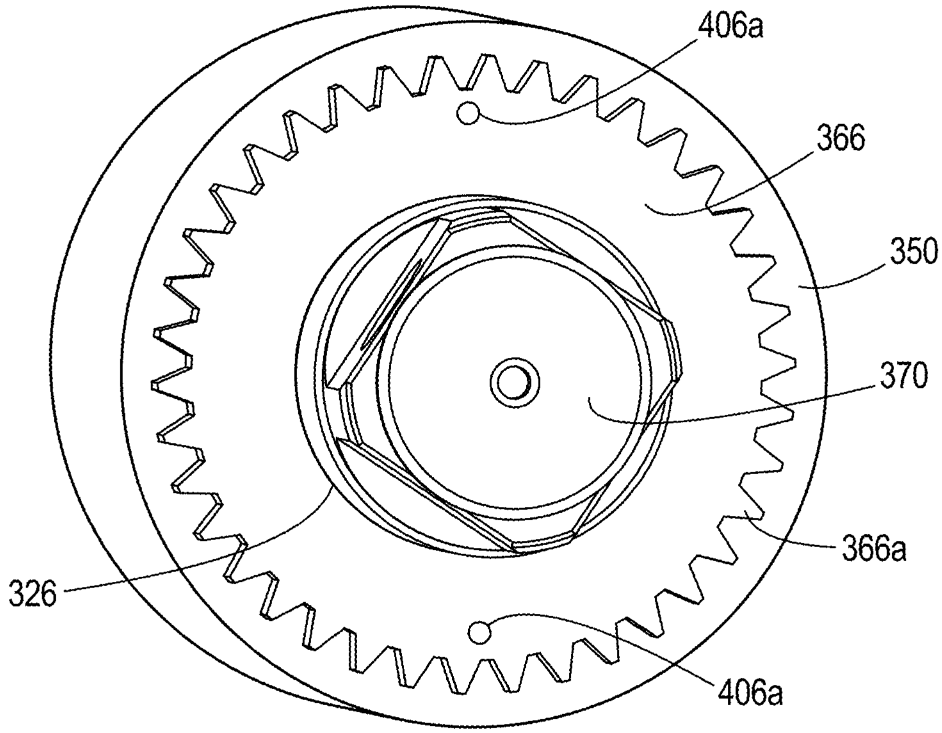
FIG. 14A is front perspective view of the first anvil, the second anvil, and the cage of FIG. 11.
Figure 14B:
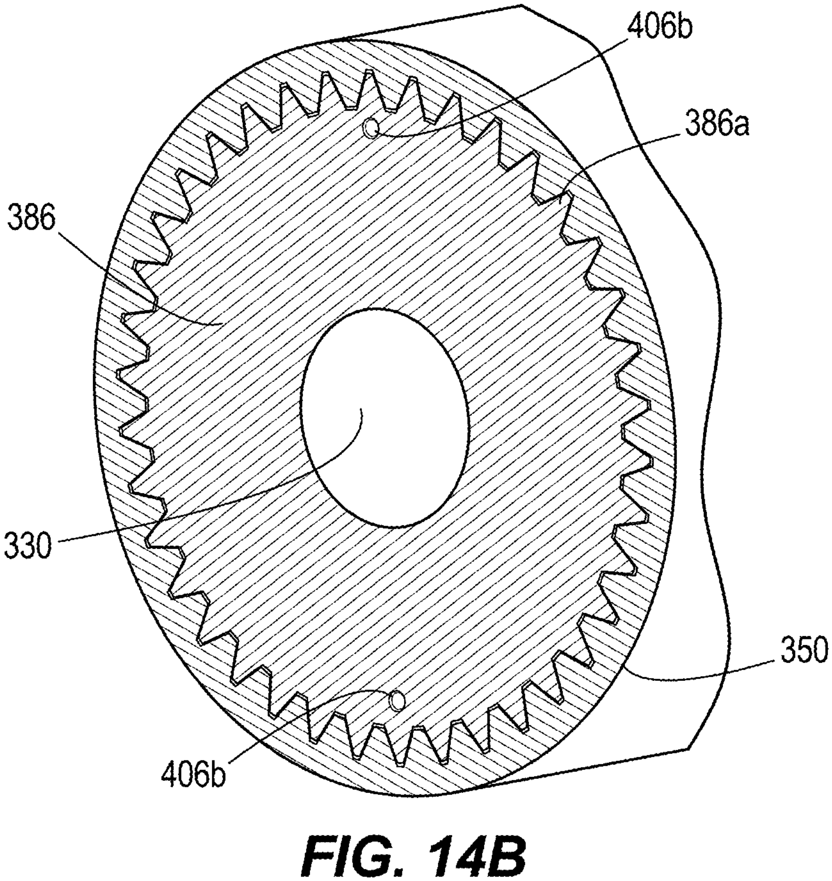
FIG. 14B is a rear perspective view of the first anvil, the second anvil, and the cage of FIG. 11.

The cage 350 is not in direct engagement with either the first mass 334 or the second mass 342 such that the first mass 334 and the second mass 342 are configured to rotate relative to the cage 350. In other words, each of the first mass 334 and the second mass 342 is configured to rotate independently of the cage 350. As such, the first anvil 326 and the second anvil 330 are assembled such that the first anvil lugs 362 align with the second anvil lugs 382 to ensure that the first mass lugs 390 impact the first anvil lugs 362 and the second mass lugs 398 impact the second anvil lugs 382 at the same time. With reference to FIGS. 14A and 14B, to ensure proper alignment of the anvil lugs 362, 382, markings 406*a*, 406*b* may be made on each of the anvils 326, 330 so that the anvils 326, 330 may be assembled with the markings 406*a* on the first anvil 326 aligned with the markings 406*b* on the second anvil 330. The markings 406*a*, 406*b* may be formed through laser engraving, machining, or another similar manufacturing process. In other embodiments, the markings 406*a*, 406*b* may be made on the hammers 334, 342. In further embodiments, the anvils 326, 330 may be assembled such that the respective markings 406*a*, 406*b* are offset from one another. In such embodiments, the total number of impacts may be increased (e.g., double) because the hammers 334, 342 no longer strike the respective anvils 326, 330 at the same time.

With reference to FIGS. 10-13, the impact mechanism 310 may be operated with a power tool, such as the power tool 10 of FIG. 1, by actuating a switch (e.g., the switch 86 of FIG. 2) to initiate rotation of the planet carrier 322 and the camshaft 318. Under a no-load condition, in which the output portion 370 of the first anvil 326 is not engaged with the workpiece 305, the camshaft 318 drives constant rotation of the first mass 334 and the second mass 342. The first mass lugs 390 of the first mass 334 may engage the first anvil lugs 362 of the first anvil 326 to drive constant rotation of the output portion 370. The second mass lugs 398 of the second mass 342 may engage the second anvil lugs 382 of the second anvil 330 to drive constant rotation of the second anvil 330. Due to the rotational lock between the first anvil 326, the second anvil 330, and the cage 350, the second mass lugs 398 may effectively drive constant rotation of the output portion 370 of the first anvil 326 through the second anvil lugs 382 of the second anvil 330.

Under a load condition, in which the output portion 370 of the first anvil 326 is engaged with the workpiece 305, the workpiece 305 increases the stiffness of the first anvil 326 such that the first anvil 326 will not rotate or will rotate slower than the camshaft 318 unless a torque is applied to the first anvil 326 that is above a threshold torque. As such, the constant rotation applied by the first mass lugs 390 to the first anvil lugs 362 and by the second mass lugs 398 to the second anvil lugs 382 is applied, in combination, at a torque that is below the threshold torque. Therefore, during the load condition, the first mass 334 will begin to rotate in an opposite direction relative to the camshaft 318 in response to the stiffness of the first anvil 326. As the first mass 334 rotates in the opposite direction relative to the camshaft 318, the first cam ball 355 will drive axial movement of the first mass 334 relative to the camshaft 318 in a direction away from the first anvil 326 (e.g., a rearward direction), thereby compressing the first mass spring 338. Once the first cam ball 355 reaches a rearward end of the first cam groove 354 such that the first mass 334 is inhibited from moving further rearwardly, the first mass 334 begins to rotate in the same direction as the camshaft 318 again, and the first mass spring 338 applies a biasing force on the first mass 334 that pushes the first mass 334 toward the first anvil 326 so that the first mass lugs 390 will impart a striking rotational force on the first anvil lugs 362.

During the load condition, the second mass 342 is configured to mirror the movements of the first mass 334. However, the first mass 334 and the second mass 342 are not coupled, or constrained, for co-rotation. Rather, the first mass 334 and the second mass 342 are configured to rotate independently of one another. As such, the second mass 342 will begin to rotate in an opposite direction relative to the camshaft 318 in response to the stiffness of the second anvil 330. As the second mass 342 rotates in the opposite direction relative to the camshaft 318, the second cam ball 358 will drive axial movement of the second mass 342 relative to the camshaft 318 in a direction away from the planet carrier 322 and the second anvil 330 (e.g., a forward direction), thereby compressing the second mass spring 346. Once the second cam ball 358 reaches a forward end of the second cam groove 357 such that the second mass 342 is inhibited from moving further forwardly, the second mass spring 346 begins to rotate in the same direction as the camshaft 318, and the second mass spring 346 applies a biasing force on the second mass 342 that pushes the second mass 342 toward the second anvil 330 so that the second mass lugs 398 will impart a striking rotational force on the second anvil lugs 382. As described previously, the impact mechanism 310 may be assembled such that the first mass 334 and the second mass 342 have mirrored movements. As such, the first mass spring 338 may bias the first mass 334 toward the first anvil 326 and the second mass spring 346 may bias the second mass 342 toward the second anvil 330 at the same time. In some embodiments, the first mass 334 and the second mass 342 may have different rebound rates (e.g., the speed with which the hammers 334, 342 translate along the camshaft 318). In such embodiments, the first camshaft portion 318*a* and the second camshaft portion 318*b* may be differently sized to account for the different rebound rates and ensure that the hammers 334, 342 strike the respective anvil 326, 330 at the same time.

During operation, the impact mechanism 310 is configured to increase the torque that the power tool can apply to the workpiece 305. Specifically, the additional impact between the second mass 342 and the second anvil 330 may double the torque that the power tool is able to apply at the output portion 370 of the first anvil 326 because the second anvil 330 is coupled for co-rotation with the output portion 370 through the cage 350. However, each impact applies torque that is proportional to the mass of just one hammer. As such, the torque increase created by the impact mechanism 310 of FIG. 10 may be less than the torque increase created by the impact mechanism 46 of FIG. 3 because the torque increase created by the impact mechanism 310 of FIG. 10 is proportional to the mass of two hammers 334, 342, whereas the torque increase of the impact mechanism of FIG. 3 is proportional to the mass of two hammers 122, 130 and the cage 138 (FIG. 3). The impact mechanism 310 of FIG. 10 is also configured to reduce vibrations felt by a user during operation of the power tool substantially similarly to the impact mechanism 46 described with respect to FIGS. 1-8.

Figure 15:
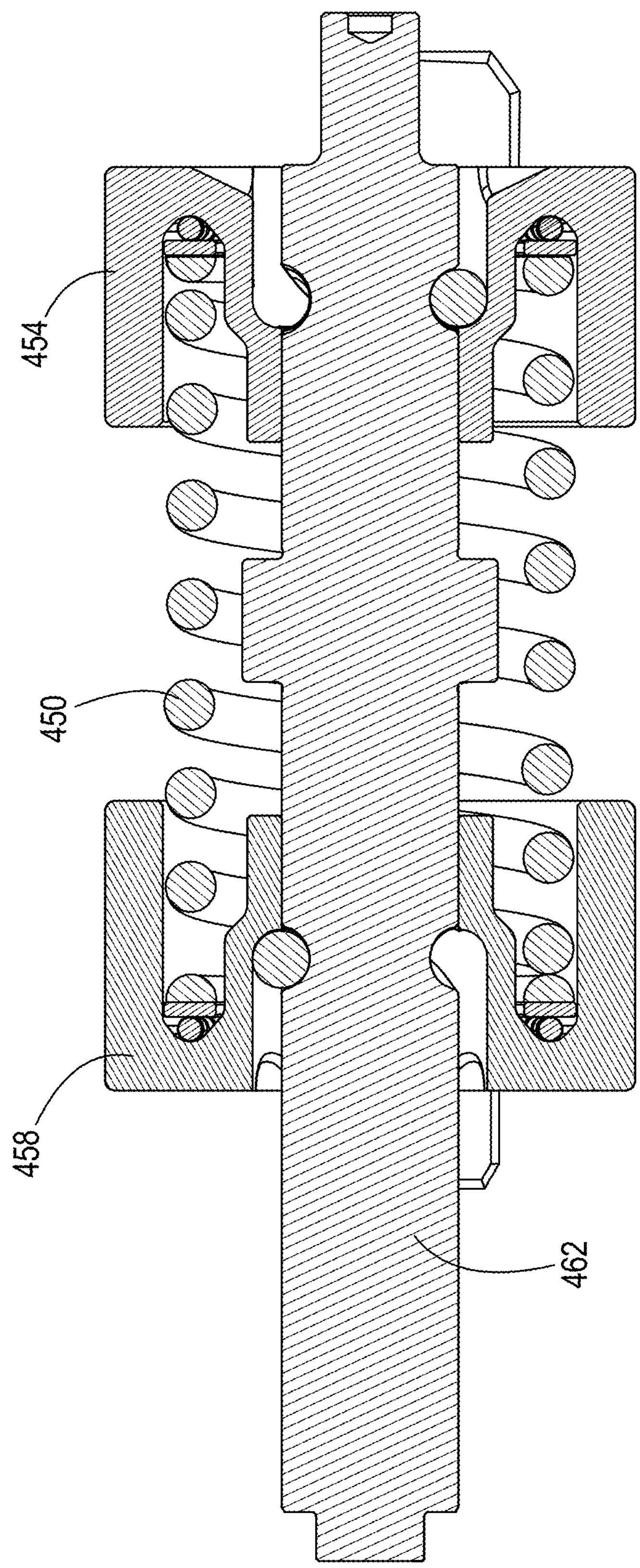
FIG. 15 is a plan view of a portion of an impact mechanism according to an embodiment of the disclosure.

In some embodiments, such as the embodiment of FIGS. 15, an impact mechanism, such as the impact mechanism 46 of FIG. 3 or the impact mechanism 310 of FIGS. 10, may include just one hammer spring 450 that is configured to bias both a first mass 454 and a second mass 458. In such embodiments, the first mass 454 and the second mass 458 are mounted to a camshaft 462 that does not include a center flange. Rather, the one hammer spring 450 extends between the first mass 454 and the second mass 458 and is configured to bias the hammers 454, 458 away from each other.

FIGS. 16A-17B illustrate a portion of an impact mechanism 510 according to another embodiment of the disclosure. The portion of the impact mechanism 510 includes a camshaft 514, an inner hammer 518, an outer hammer 522, a ramped collar 526, an inner hammer spring 530, and an outer hammer spring 534. The inner hammer 518 and the ramped collar 526 are coupled to the camshaft 514. More specifically, the inner hammer 518 is coupled to the camshaft 514 by a cam groove and cam ball arrangement 536 such that the inner hammer 518 is configured to reciprocate and rotate relative to the camshaft 514 to deliver periodic rotational impacts to an anvil (such as the anvil 118; FIG. 3), and the ramped collar 526 is fixed to the camshaft 514 for co-rotation therewith. The outer hammer 522 is mounted to the inner hammer 518 and may be configured to rotate with and move axially relative to the inner hammer 518. The inner hammer spring 530 has an end located at the ramped collar 526 and another end located at a rearward side of the inner hammer 518. As such, the inner hammer spring 530 biases the inner hammer 518 away from the camshaft 514 and/or the ramped collar 526 (e.g., toward an anvil). The outer hammer spring 534 has an end that may be located, for example, at a front housing portion of a power tool and another end that is located at a front side of the outer hammer 522. As such, the inner hammer 518 and the outer hammer 522 are biased in different directions.

The outer hammer 522 includes a protruding portion 538 that is positioned at a rearward side of the outer hammer 522 (i.e., opposite from the outer hammer spring 534). Specifically, although only one protruding portion 538 is illustrated, the outer hammer 522 includes a plurality of protruding portions 538 (e.g., two protruding portions 538). The ramped collar 526 includes a recessed portion 542. Specifically, although only one recess portion 542 is illustrated, the ramped collar 526 includes a plurality of recessed portions 542 (e.g., two recessed portions 542). Each of the protruding portions 538 is configured to slide into and out of a corresponding one of the recessed portions 542 during operation of the portion of the impact mechanism 510, as will be described in more detail.

Figure 16B:
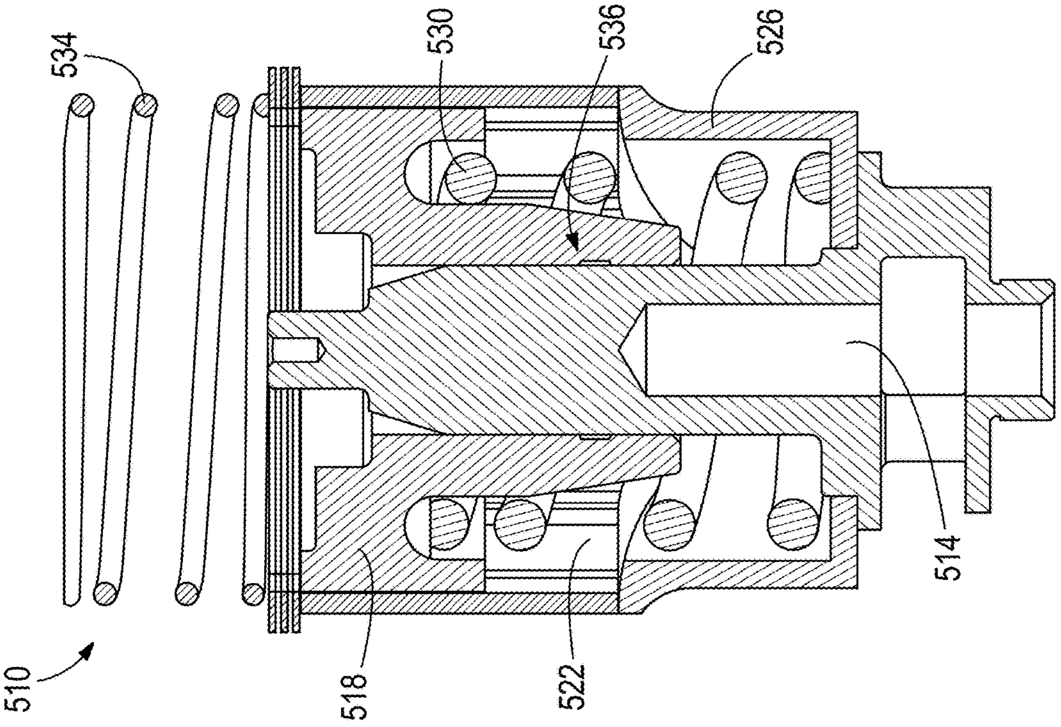
FIG. 16B is a cross-sectional view of the portion of the impact mechanism of FIG. 16A taken along line 16B-16B of FIG. 16A.
Figure 16A:
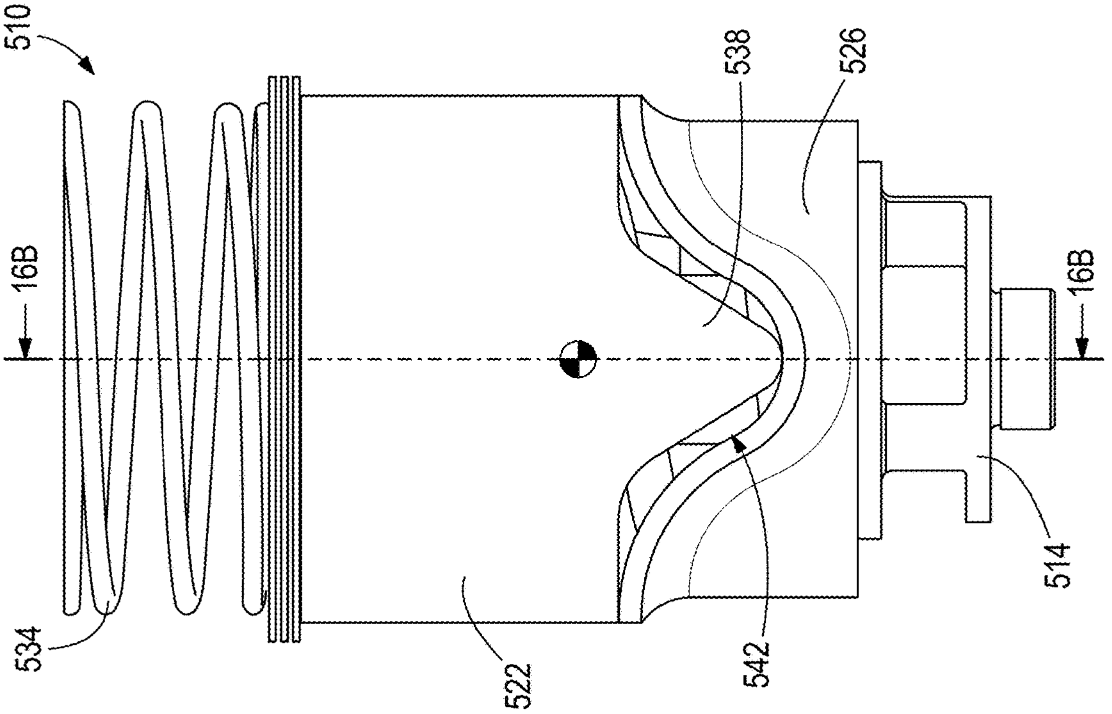
FIG. 16A is a plan view of a portion of an impact mechanism according to another embodiment of the disclosure with the portion of the impact mechanism in a first position.
Figure 17B:
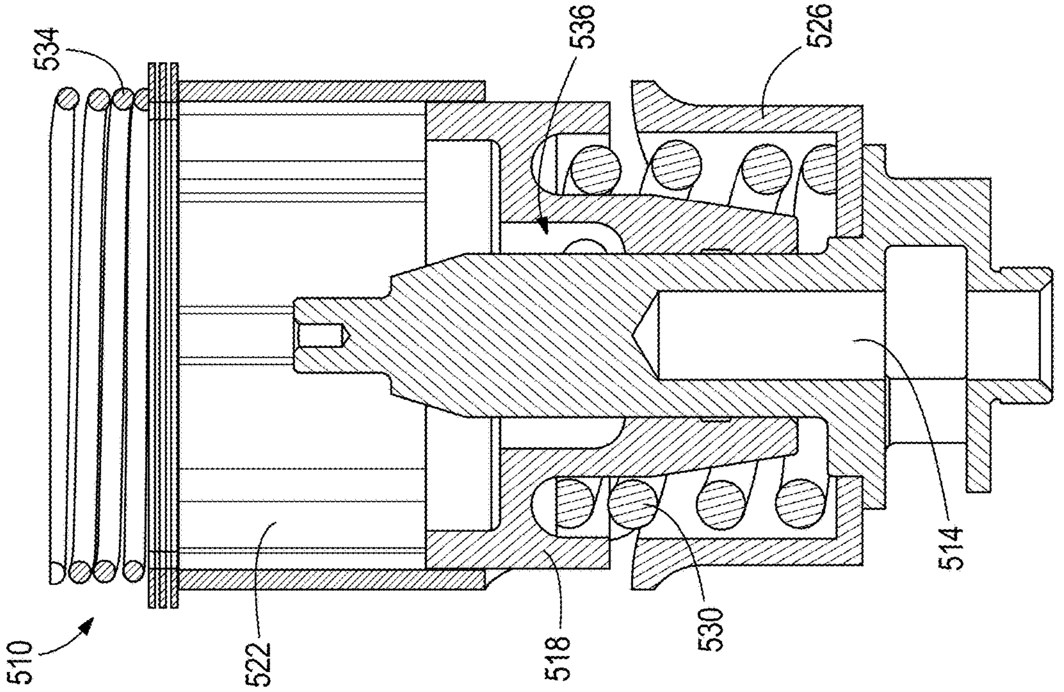
FIG. 17B is a cross-sectional view of the portion of the impact mechanism of FIG. 17A taken along line 17B-17B.
Figure 17A:
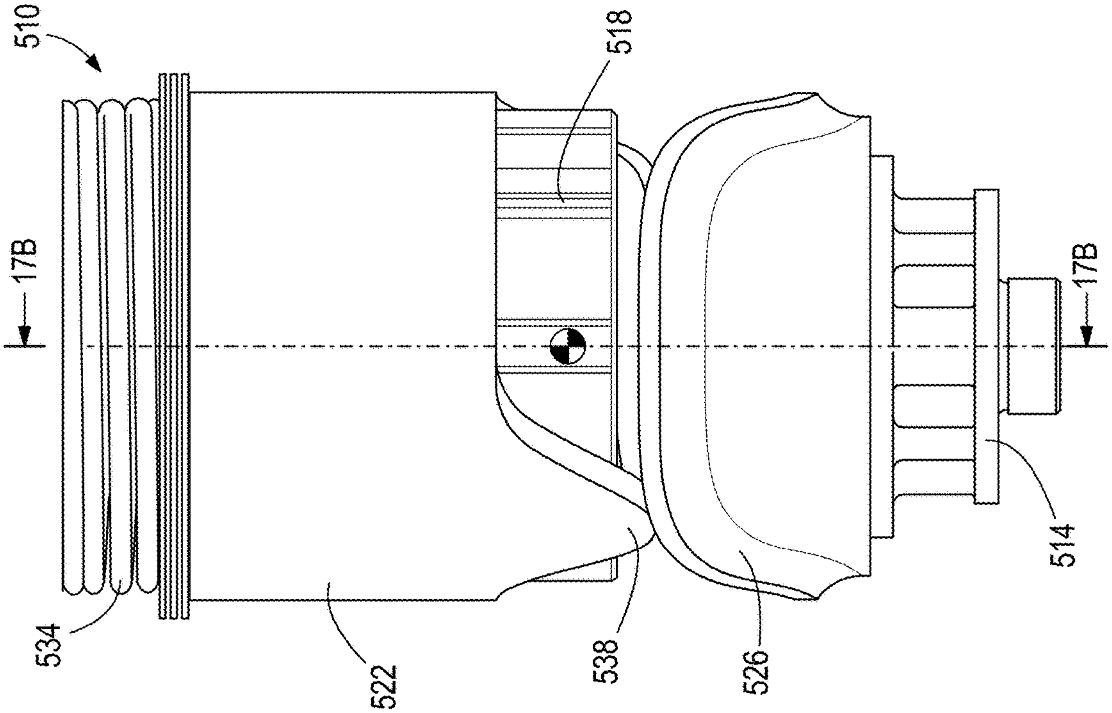
FIG. 17A is a plan view of a portion of the impact mechanism of FIG. 16A in a second position.

During operation of the portion of the impact mechanism 510, with reference to FIGS. 16A-17B, the impact mechanism 510 may oscillate between an expanded position (FIG. 16A) and a compressed position (FIG. 16A). Specifically, the impact mechanism 510 may be in the expanded position at the start of operation and during, or directly after, impact between the inner hammer 518 and an anvil. The impact mechanism 510 may be in the compressed position directly before impact between the inner hammer 518 and the anvil. In the expanded position, the inner hammer spring 530 biases the inner hammer 518 to a forward-most position for engagement with an anvil, and the outer hammer spring 534 biases the outer hammer 522 to a rearward-most position. In the compressed position, the inner hammer 518 compresses the inner hammer spring 530 such that the inner hammer 518 is at a rearward-most position, and the outer hammer 522 compresses the outer hammer spring 534 such that the outer hammer 522 is at a forward-most position.

As the impact mechanism 510 moves between the expanded position and the compressed position, the inner hammer 518 and the outer hammer 522 are configured to move simultaneously in opposite directions. Specifically, the ramped collar 526 mounted to the camshaft 514 facilitates the forward movement of the outer hammer 522 against the bias of the outer hammer spring 534. That is, during operation, the inner hammer 518 may begin to rotate in an opposite direction relative to the camshaft 514. Because the outer hammer 522 is configured to rotate with the inner hammer 518, the outer hammer 522 is configured to rotate in an opposite direction relative to the ramped collar 526 such that the protruding portions 538 of the outer hammer 522 slide out of the recessed portions 542 in the ramped collar 526 to push the outer hammer 522 forward. As such, the simultaneous and opposite movement of the hammers 518, 522 relative to the camshaft 514 may the dampen vibrations during impact by controlling the movement the center of mass of the impact mechanism 510. That is, the relative movements of the hammers 518, 522 may reduce the volatility of movement of the center of mass during operation of the impact mechanism 510. Therefore, the relative movement of the inner hammer 518 and the outer hammer 522 may result in negligible vibrations felt by a user operating the impact mechanism 510. In some embodiments, the outer hammer 522 may include a roller at the tip of the protruding portions 538 to reduce friction between the outer hammer 522 and the ramped collar 526 as the outer hammer 522 moves between the expanded position and the compressed position.

Although the disclosure has been described in detail with reference to certain preferred embodiments, variations and modifications exist within the scope and spirit of one or more independent aspects of the disclosure as described.

Various features and aspects of the disclosure are set forth in the following claims.

What is claimed is:

1. A power tool comprising:
a housing;
a drive assembly supported by the housing and including a motor configured to drive an output; and
an impact mechanism supported by the housing, the impact mechanism including
a camshaft coupled for co-rotation with the output of the drive assembly,
an anvil extending from the housing,
a first mass coupled to the camshaft such that the first mass is configured to reciprocate along the camshaft and rotate relative to the camshaft to deliver periodic rotational impacts to the anvil, and
a second mass coupled to the camshaft such that the second mass is configured to reciprocate along the camshaft opposite the first mass to at least partially compensate vibrations caused by reciprocation of the first mass.

2. The power tool of claim 1, wherein the impact mechanism includes a first spring biasing the first mass toward the anvil.

3. The power tool of claim 2, wherein the impact mechanism includes a second spring biasing the second mass in a direction away from the anvil.

4. The power tool of claim 3, wherein the camshaft includes a flange positioned between the first spring and the second spring.

5. The power tool of claim 1, wherein the anvil is a first anvil, wherein the impact mechanism includes a second anvil coupled for co-rotation with the first anvil, and wherein the second mass is configured to deliver periodic rotational impacts to the second anvil.

6. The power tool of claim 1, wherein the impact mechanism includes a pin extending between the first mass and the second mass.

7. The power tool of claim 6, wherein the first mass includes a first groove defined in an outer surface of the first mass, wherein the second mass includes a second groove defined in an outer surface of the second mass, and wherein the pin is at least partially received in both the first groove and the second groove to couple the first mass for co-rotation with the second mass.

8. The power tool of claim 1, wherein the impact mechanism further includes a cage that surrounds the first mass and the second mass, and wherein the first mass and the second mass are coupled for co-rotation with the cage.

9. The power tool of claim 1, wherein the housing includes a handle portion having a grip, and wherein the power tool is configured to produce a total hand arm vibration at the grip of less than 9.8 m/s2 while delivering 2,000 ft-lbs of fastening torque to a workpiece coupled to the anvil.

10. The power tool of claim 1, wherein the drive assembly includes a transmission driven by the motor, wherein the transmission includes a plurality of planet gears and a planet carrier, and wherein the planet carrier defines the output of the drive assembly.

11. A power tool comprising:

a housing;

a drive assembly supported by the housing and including a motor configured to drive an output; and an impact mechanism supported by the housing, the impact mechanism including a camshaft coupled for co-rotation with the output of the drive assembly, an anvil extending from the housing, a first mass coupled to the camshaft such that the first mass is configured to reciprocate along the camshaft and rotate relative to the camshaft to deliver periodic rotational impacts to the anvil, and a second mass configured to reciprocate relative to the camshaft to at least partially compensate vibrations caused by reciprocation of the first mass.

12. The power tool of claim 11, wherein the camshaft includes a first cam groove and a second cam groove, wherein the first mass is coupled to the camshaft via the first cam groove, and wherein the second mass is coupled to the camshaft via the second cam groove.

13. The power tool of claim 11, wherein the second mass is coupled for co-rotation with the first mass.

14. The power tool of claim 11, further comprising a ramped collar coupled for co-rotation with the camshaft and a spring biasing the second mass into engagement with the ramped collar, wherein rotation of the ramped collar relative to the second mass causes the second mass to reciprocate relative to the camshaft.

15. The power tool of claim 11, further comprising a cage surrounding the first mass and the second mass, wherein the first mass, the second mass, and the cage are coupled together for co-rotation.

16. The power tool of claim 11, wherein the housing includes a handle portion having a grip, and wherein the power tool is configured to produce a total hand arm vibration at the grip between 0.4g and 1g while delivering between 1,000 ft-lbs and 2,000 ft-lbs of fastening torque to a workpiece coupled to the anvil.

17. The power tool of claim 16, wherein the power tool is configured to produce a total hand arm vibration at the grip between 0.6g and 1g while delivering between 1,500 ft-lbs and 2,000 ft-lbs of fastening torque to a workpiece coupled to the anvil.

18. The power tool of claim 16, wherein the power tool is configured to produce a total hand arm vibration at the grip between 2 m/s2 and 12 m/s2 when operating at an impacting frequency between 20 hz and 60 hz.

19. The power tool of claim 11, wherein the impact mechanism includes a first spring biasing the first mass toward the anvil, and wherein the impact mechanism includes a second spring biasing the second mass in a direction away from the anvil.

20. The power tool of claim 19, wherein the camshaft includes a flange positioned between the first spring and the second spring.

* * * * *